United States Patent
Kobayashi et al.

(10) Patent No.: US 8,942,097 B2
(45) Date of Patent: Jan. 27, 2015

(54) NETWORK SYSTEM AND FRAME COMMUNICATION METHOD

(75) Inventors: Noriaki Kobayashi, Tokyo (JP); Satoshi Kamiya, Tokyo (JP)

(73) Assignee: NEC Corporation, Tokyo (JP)

(*) Notice: Subject to any disclaimer, the term of this patent is extended or adjusted under 35 U.S.C. 154(b) by 359 days.

(21) Appl. No.: 13/446,675

(22) Filed: Apr. 13, 2012

(65) Prior Publication Data

US 2012/0263038 A1 Oct. 18, 2012

(30) Foreign Application Priority Data

Apr. 18, 2011 (JP) .................. 2011-092087

(51) Int. Cl.
*H04L 12/26* (2006.01)
*H04L 12/24* (2006.01)

(52) U.S. Cl.
CPC ..................... *H04L 41/00* (2013.01)
USPC ........................................ 370/235

(58) Field of Classification Search
CPC ................ H04I 12/24; H04L 12/56
USPC ........................................ 370/235
See application file for complete search history.

(56) References Cited

U.S. PATENT DOCUMENTS

| | | | |
|---|---|---|---|
| 6,639,910 B1 | 10/2003 | Provencher et al. | |
| 2003/0067929 A1* | 4/2003 | Matsuzawa | 370/401 |
| 2010/0142545 A1 | 6/2010 | Kurita | |
| 2013/0318051 A1* | 11/2013 | Kumar et al. | 707/692 |

FOREIGN PATENT DOCUMENTS

| | | |
|---|---|---|
| JP | 2010-141443 | 6/2010 |
| WO | 01/91345 | 11/2001 |

OTHER PUBLICATIONS

INCITS TC T11, Fibre Channel Backbone-5, http://www.fcoe.com/09-056v5.pdf, Jun. 4, 2009.
Japanese Official Action—2011-092087—Nov. 4, 2014.
Satoshi Kamiya et al., Proposal for Extension of Fibre Channel Over Ethernet: "Advanced FCoE" Institute of Electronics, Information, and Communication Engineers, Technical review of IEICE CPSY2010-26, Incorporated Association IEICE, Nov. 5, 2010, Computer system 110(278), pp. 5-10.
Gary Lee, Ethernet Technology Summit, Ethernet Fabric Requirements for FCoE in the Data Center, Feb. 2010, pp. 1-14, URL, http://bawd.com/ETS10/ETS10-Lee.pdf.

* cited by examiner

*Primary Examiner* — Shripal Khajuria
(74) *Attorney, Agent, or Firm* — Young & Thompson

(57) ABSTRACT

A network system has: a node performing transmission and reception of a frame based on FCoE (Fiber Channel Over Ethernet); a network; a controller performing management of the node and the network; and a gateway provided with respect to the node. The gateway determines whether a frame received from the node is a control frame or a data frame, forwards the control frame to the controller, and forwards the data frame to the network. The controller performs the management based on the control frame received from the gateway. The network transfers the data frame received from the gateway to a target node without through the controller. The controller comprises a flow management unit that manages a transfer route of the data frame in the network with respect to each flow.

10 Claims, 19 Drawing Sheets

US 8,942,097 B2

NETWORK SYSTEM AND FRAME COMMUNICATION METHOD

INCORPORATION BY REFERENCE

This application is based upon and claims the benefit of priority from Japanese patent application No. 2011-092087, filed on Apr. 18, 2011, the disclosure of which is incorporated herein in its entirety by reference.

TECHNICAL FIELD

The present invention relates to a network system that performs frame communication.

BACKGROUND ART

One of technologies for performing communication on a network is "data encapsulation". The details are as follows.

A data transferred between networks constitutes its form in accordance with a communication system used at the time of the transfer. The communication on the network is performed through a plurality of layers, as represented by OSI Reference Model and TCP/IP stack. Therefore, the form of the data needs to be capable of supporting specification of each layer. In general, a data consists of a header and a payload. The header includes a content that serves as a control data at a specific layer, and a communication standard at that layer interprets the content of the header to forward the payload to another layer. At each layer, the header is added ahead of the payload at a time of transmission and the header is removed at a time of reception. Therefore, the payload includes a content that can serve as the header at an upper layer. When a data communication is initiated, a data is generated from the top layer of the communication system. The data passes through lower layers one after another, passes through the bottom layer and then is output to the network. Before the data reaches the bottom layer, the header associated with each layer is added to the data and a portion being the header at the upper layer is treated as the payload. The addition of the header thus performed is called the data encapsulation.

The data encapsulation can be regarded as a technique that makes it possible by adding the header associated with a specific communication system to communicate with the communication system with which communication has not been available. By the application of this technique, it is possible to improve data security and to create a new communication system that can support a plurality of existing communication systems.

A new communication system that utilizes this technique is described in Non-Patent Literature 1. According to Non-Patent Literature 1, "Fibre Channel Over Ethernet (FCoE)" is proposed as one technique for a recent data center.

A recent data center is operated with a network configuration in which Storage Area Network (SAN) as represented by Fibre Channel (FC) and Local Area Network (LAN) as represented by Ethernet (registered trade mark) are mixed. Since separate networks are mixed, management costs and device costs are rising, which is a problem.

Because of this situation, the FCoE has been proposed. According to the FCoE, an FC data is encapsulated by using an Ethernet header and a newly-defined FCoE header. As a result, it is possible to integrate the communication system into the Ethernet system and to achieve a network configuration that the SAN and the LAN are integrated. Since uniform management and devices can be achieved on the integrated network, the FCoE is considered as a promising technique for solving the problem.

However, according to the current FCoE, the communication needs to invariably go through an FCoE communication-dedicated switch that is called an "FCoE Forwarder (FCF)". This causes constraint on network flexibility and extensibility. Therefore, it is not possible to deal with the data center configuration that utilizes a large number of nodes.

CITATION LIST

Non-Patent Literature

[Non-Patent Literature 1] INCITS TC T11, Fibre Channel Backbone-5, http://www.fcoe.com/09-056v5.pdf

SUMMARY

In the communication system described in Non-Patent Literature 1, there exists a device through which frames invariably go at a time of communication. This causes deterioration of network flexibility and extensibility.

An object of the present invention is to provide a technique that can improve network flexibility and extensibility.

In an aspect of the present invention, a network system is provided. The network system has: a node configured to perform transmission and reception of a frame based on FCoE (Fibre Channel Over Ethernet); a network configured to transfer the frame; a controller configured to perform management of the node and the network; and a gateway provided with respect to the node. The frame is classified into a control frame for communicating control information necessary for communication and a data frame for communicating data between nodes. The gateway determines whether a frame received from the node is the control frame or the data frame, forwards the control frame to the controller, and forwards the data frame to the network. The controller performs the management based on the control frame received from the gateway. The network transfers the data frame received from the gateway to a target node without through the controller. The controller has a flow management unit configured to manage a transfer route of the data frame in the network with respect to each flow.

In another aspect of the present invention, a frame communication method in a network system is provided. The network system has: a node configured to perform transmission and reception of a frame based on FCoE (Fibre Channel Over Ethernet); a network configured to transfer the frame; and a controller configured to perform management of the node and the network. The frame is classified into a control frame for communicating control information necessary for communication and a data frame for communicating data between nodes. The frame communication method includes: (A) determining whether a frame transmitted from the node is the control frame or the data frame; (B) forwarding the control frame to the controller and performing, in the controller, the management based on the control frame; (C) forwarding the data frame to the network and transferring the data frame to a destination node without through the controller; and (D) managing, by said controller, a transfer route of said data frame in said network with respect to each flow.

According to the present invention, frames transmitted from the node are divided into the control frames and the data frames. The data frames whose amount of information is enormous as compared with the control frames are transferred without through a specific route. That is, the communication system according to the present invention is freed from the constraint that there exists a device through which the data frames, which greatly contributes to network performance, invariably go. It is therefore possible to improve network flexibility and extensibility.

Furthermore, according to the present invention, the controller performs centralized management of a transfer route of the data frame in the network with respect to each flow. It is thus possible to improve utilization efficiency and communication performance of the network.

BRIEF DESCRIPTION OF THE DRAWINGS

The above and other objects, advantages and features of the present invention will be more apparent from the following description of certain exemplary embodiments taken in conjunction with the accompanying drawings, in which.

EXEMPLARY EMBODIMENTS

Exemplary embodiments of the present invention will be described with reference to the attached drawings.

1. U/C Separation Function

The applicant of this patent application has described, in a prior application (Japanese Patent Application JP-2010-208048) that is not yet published, a "U/C separation function" as a means of solving the above-mentioned problems. According to the U/C separation function, frames transmitted from a node are divided into data frames (user data frames) and control frames. The data frames whose amount of information is enormous as compared with the control frames are transferred without through a specific route. That is, the U/C separation function makes it possible to be freed from the constraint that there exists a device through which the data frames, which greatly contributes to network performance, invariably go. It is therefore possible to improve network flexibility and extensibility.

Hereinafter, the U/C separation function will be described in detail. It should be noted that the contents described in Japanese Patent Application JP-2010-208048 that is not yet published are incorporated herein in its entirety by reference.

1-1. Configuration

Figure 1:
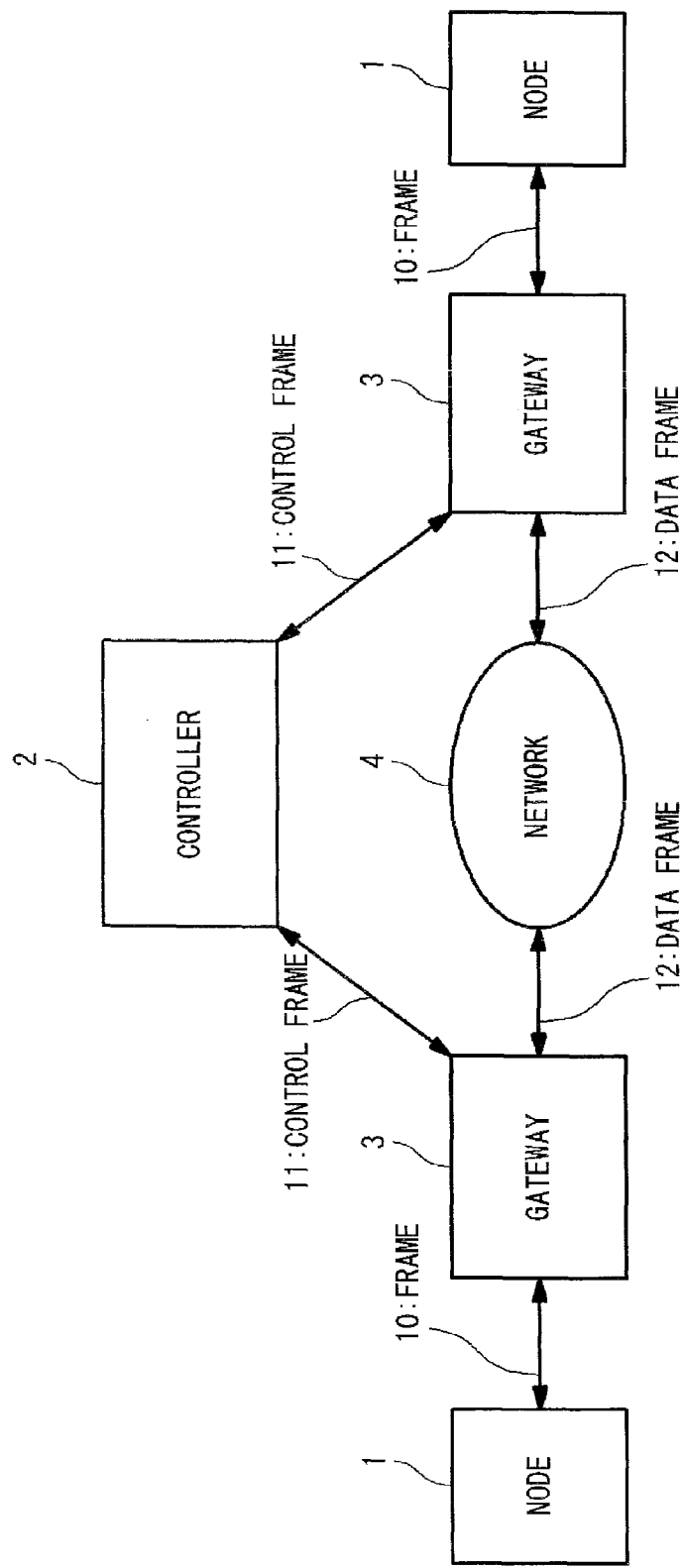
FIG. 1 is a block diagram showing a configuration of a network system according to an exemplary embodiment of the present invention.

FIG. 1 is a block diagram showing a configuration of a network system according to the present exemplary embodiment. The network system according to the present exemplary embodiment has a node 1, a controller 2, a gateway 3 and a network 4. The node 1 is connected to the gateway 3. The gateway 3 is connected between the node 1 and the network 4. The controller 2 is connected to each gateway 3.

The node 1 performs transmission and reception of frames 10. The frames 10 are classified into control frames 11 and data frames 12. The control frame 11 is a frame 10 used for communicating control information necessary for communication. For example, the control frame 11 is used for accessing to a communication network, logging-in a device and exchanging information for it. On the other hand, the data frame 12 is a frame 10 used for data transmission and reception between the nodes 1. It should be noted here that the amount of information of the data frames 12 is enormous as compared with that of the control frames 11. It is possible to discriminate the control frame 11 and the data frame 12 based on a frame type of the frame 10.

The network 4 transfers the frames 10 that are communicated between the nodes 1. The network 4 is configured by a combination of connection devices such as switches that relay frames and network cables connecting between the connection devices.

The gateway 3 and the node 1 are configured in pairs. The gateway 3 receives a frame 10 transmitted from the node 1 and determines whether the received frame 10 is a control frame 11 or a data frame 12. Then, the gateway 3 forwards the control frame 11 to the controller 2 and forwards the data frame 12 to the network 4. That is, the data frames 12 whose amount of information is enormous are transferred by the network 4 to a destination without going through the controller 2. Moreover, the gateway 3 receives a frame 10 (control frame 11, data frame 12) from the controller 2 and the network 4 and forwards the received frame 10 to the node 1. It should be noted that the gateway 3, when forwarding the frame 10, changes information of the frame 10 as necessary such that the destination device can treat the frame 10 correctly. The details will be described later.

The controller 2 receives the control frame 11 from the gateway 3 and treats the control frame 11. More specifically, the controller 2 performs management of information regarding the node 1 and the network 4, based on contents of the received control frame 11. Moreover, the controller 2 transmits or forwards the frame 10 to the node 1 and the gateway 3, as necessary.

Figure 2:
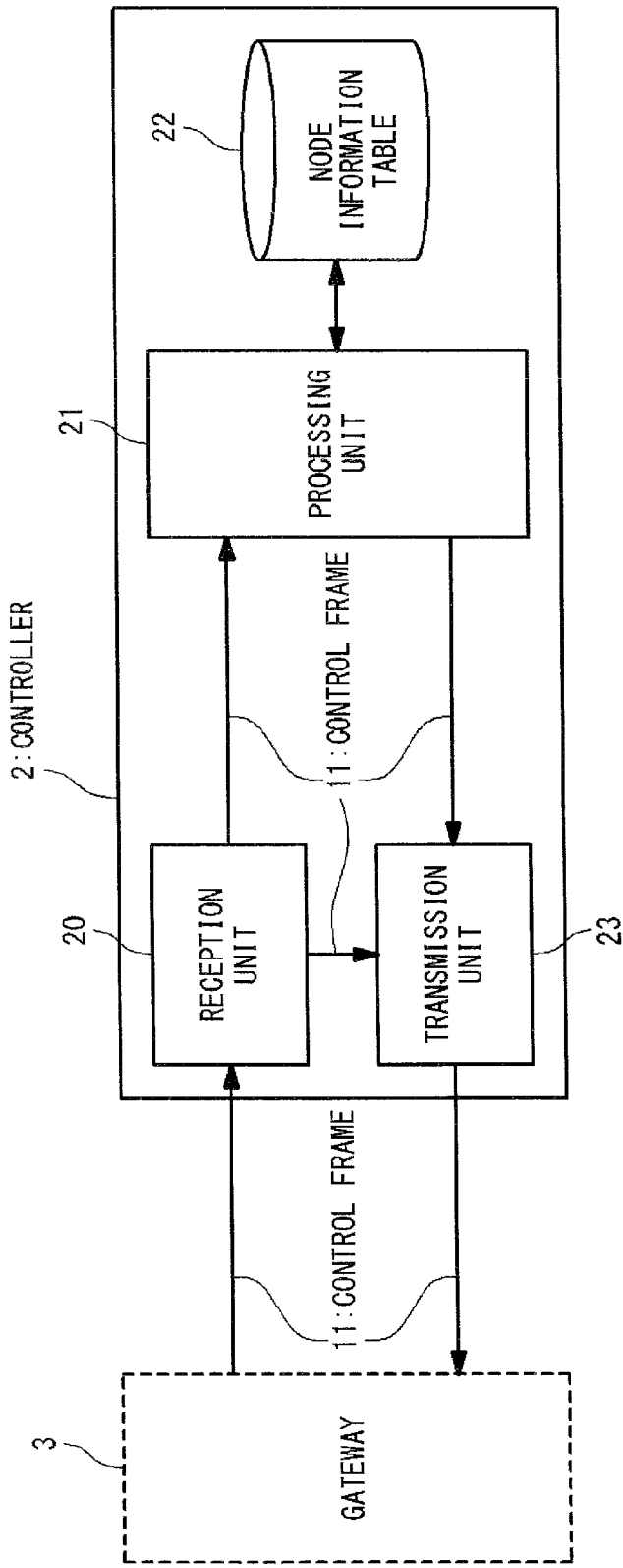
FIG. 2 is a block diagram showing a configuration of a controller according to the exemplary embodiment of the present invention.

A configuration of the controller 2 will be described below in detail. FIG. 2 is a block diagram showing a configuration of the controller 2. The controller 2 has a reception unit 20, a processing unit 21, a node information table 22 and a transmission unit 23.

The node information table 22 indicates management information regarding the node 1, the gateway 3 and the connection devices on the network 4. The reception unit 20 receives the control frame 11 from the gateway 3 and forwards the control frame 11 to the processing unit 21. The processing unit 21 performs processing according to contents of the received control frame 11. For example, the processing unit 21 updates the node information table 22 according to contents of the control frame 11. Also, the processing unit 21 generates a reply control frame 11 by referring to the node information table 22 and outputs the reply control frame 11 to the transmission unit 23. Also, the processing unit 21 forwards the received control frame 11 as it is to the transmission unit 23. The transmission unit 23 transmits the control frame 11 received from the processing unit 21 to a target gateway 3.

Figure 3:
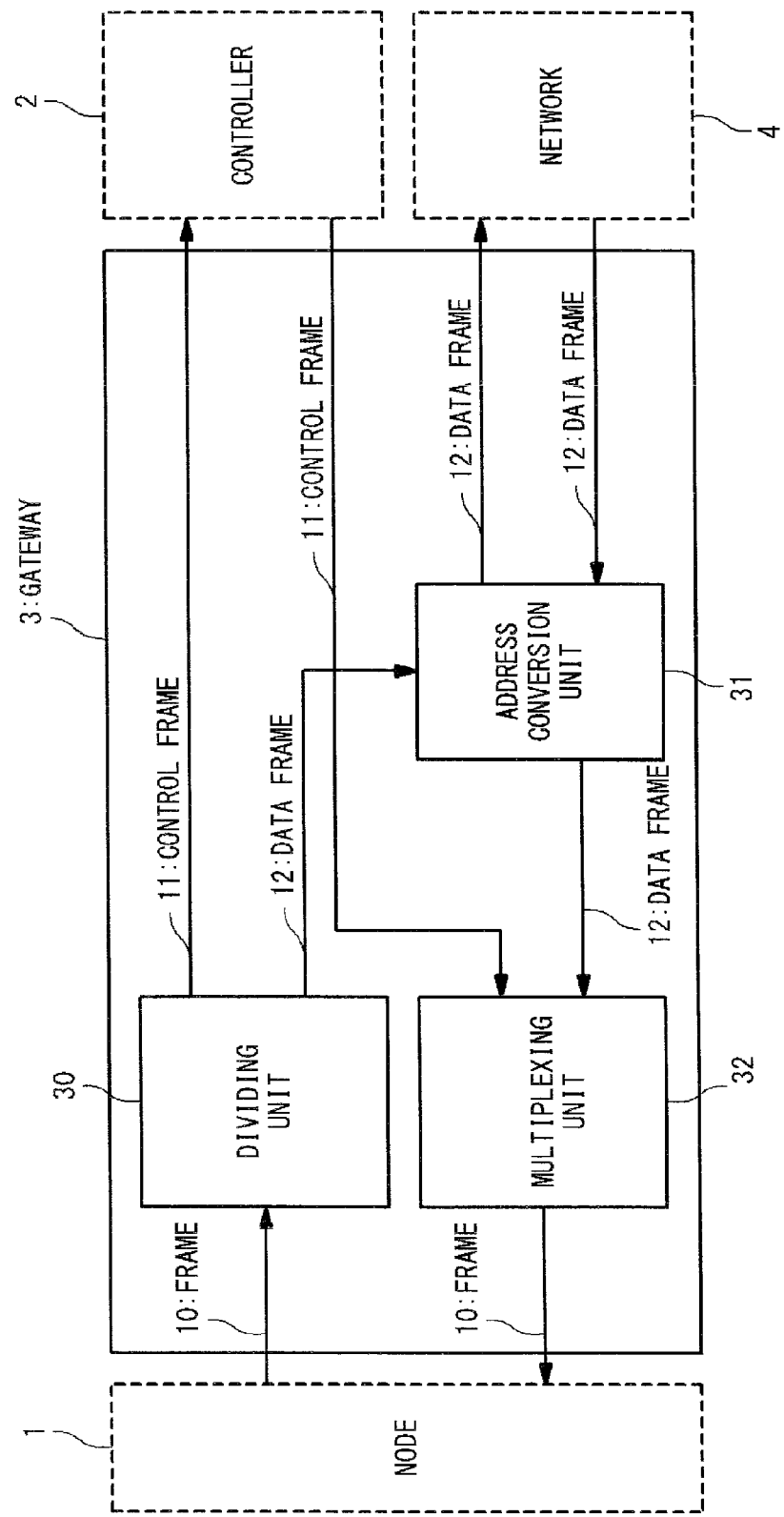
FIG. 3 is a block diagram showing a configuration of a gateway according to the exemplary embodiment of the present invention.

A configuration of the gateway 3 will be described below in detail. FIG. 3 is a block diagram showing a configuration of the gateway 3. The gateway 3 has a dividing unit 30, an address conversion unit 31 and a multiplexing unit 32.

The dividing unit 30 receives a frame 10 from the node 1. The dividing unit 30 analyzes the received frame 10 to determine whether the frame 10 is a control frame 11 or a data frame 12. Then, the dividing unit 30 forwards the control frame 11 to the controller 2 and forwards the data frame 12 to the address conversion unit 31. The address conversion unit 31 converts a destination MAC address of the data frame 12 received from the dividing unit 30 and then forwards the data frame 12 to the network 4. Moreover, when receiving a data frame 12 from the network 4, the address conversion unit 31 converts a source MAC address of the received data frame 12 and then outputs the data frame 12 to the multiplexing unit 32. The multiplexing unit 32 outputs the control frame 11 input from the controller 2 and the data frame 12 input from the address conversion unit 31 to the node 1.

According to the present exemplary embodiment, as described above, the frames 10 transmitted from the node 1 are divided into the control frames 11 and the data frames 12. The data frames 12 whose amount of information is enormous as compared with the control frames 11 are transferred without through a specific route (controller 2). That is, the communication system according to the present exemplary embodiment is freed from the constraint that there exists a device through which the data frames 12, which greatly contributes to network performance, invariably go. It is therefore possible to improve network flexibility and extensibility.

1-2. Operation Flow of Controller 2

Figure 4:
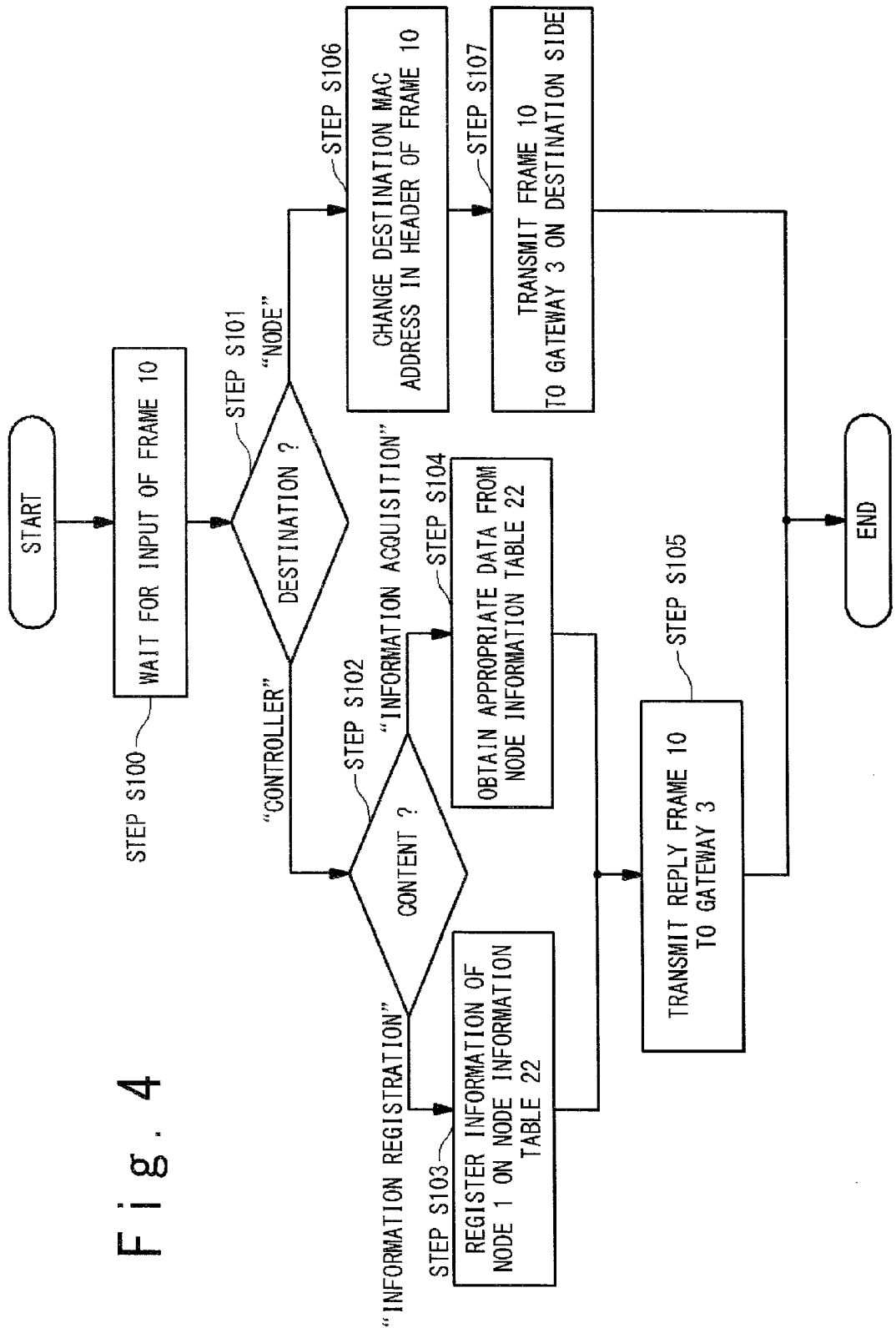
FIG. 4 is a flow chart showing an operation of a controller according to the exemplary embodiment of the present invention.

FIG. 4 is a flow chart showing an operation of the controller 2 according to the present exemplary embodiment. An operation flow of the controller 2 will be described below with reference to FIG. 2 and FIG. 4.

Step S100:
The processing unit 21 waits for input of the frame 10 (control frame 11) from the reception unit 20.

Step S101:
The processing unit 21 refers to a header and a payload of the frame 10 received from the reception unit 20 to determine whether the destination (terminal) of the frame 10 is the controller 2 or a node 1 on the opposite side of the source. If the destination is the controller 2, the processing proceeds to Step S102. On the other hand, if the destination is the node 1, the processing proceeds to Step S106.

Step S102:
The processing unit 21 determines a type of the frame 10. More specifically, the processing unit 21 determines whether the frame 10 is one (information registration frame) for registering information of the source node 1 or one (information acquisition frame) for acquiring information of another node 1 or the controller 2. In the case of the information registration frame, the processing proceeds to Step S103. On the other hand, in the case of the information acquisition frame, the processing proceeds to Step S104.

Step S103:
Based on the information registration frame, the processing unit 21 registers the information of the source node 1 on the node information table 22. After that, the processing proceeds to Step S105.

Step S104:
The processing unit 21 obtains information corresponding to requirement by the information acquisition frame from the node information table 22. After that, the processing proceeds to Step S105.

Step S105:
The processing unit 21 generates a reply frame 10 (control frame 11). In the case where the above-mentioned Step S104 is performed, the processing unit 21 incorporate the information obtained from the node information table 22 into the reply frame 10. Then, the processing unit 21 outputs the reply frame 10 to the transmission unit 23. The transmission unit 23 transmits the reply frame 10 to the gateway 3 on the side of the source node 1.

Step S106:
On the other hand, if the destination is the node 1, the processing unit 21 changes a destination MAC address of the frame 10 by referring to the node information table 22. Then, the processing unit 21 outputs the frame 10 to the transmission unit 23.

Step S107:
The transmission unit 23 transmits the frame 10 to the gateway 3 on the side of the destination node 1.

1-3. Modification Example

Figure 5:
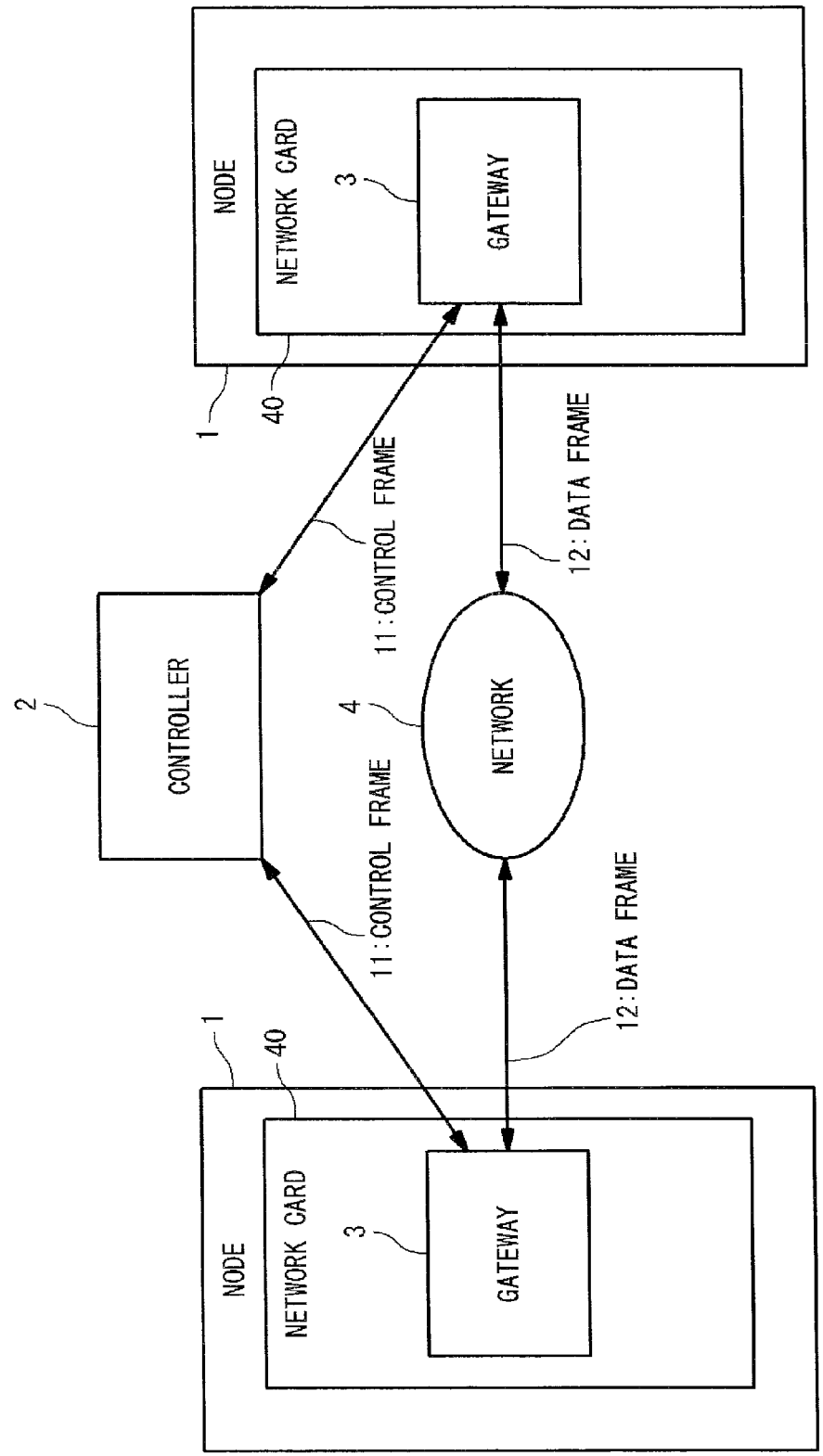
FIG. 5 is a block diagram showing a modification example of the network system according to the exemplary embodiment of the present invention.

FIG. 5 is a block diagram showing a modification example of the network system according to the present exemplary embodiment. According to the present modification example, the gateway 3 is built in a network device within the node 1. More specifically, the node 1 has a network card 40, and the gateway 3 is built in the network card 40. The gateway 3 in FIG. 5 is the same as the gateway 3 in FIG. 1 except for the installation location. According to the present modification example, functions are concentrated in the node 1 and thus the network flexibility is expected to be further improved.

Figure 6:
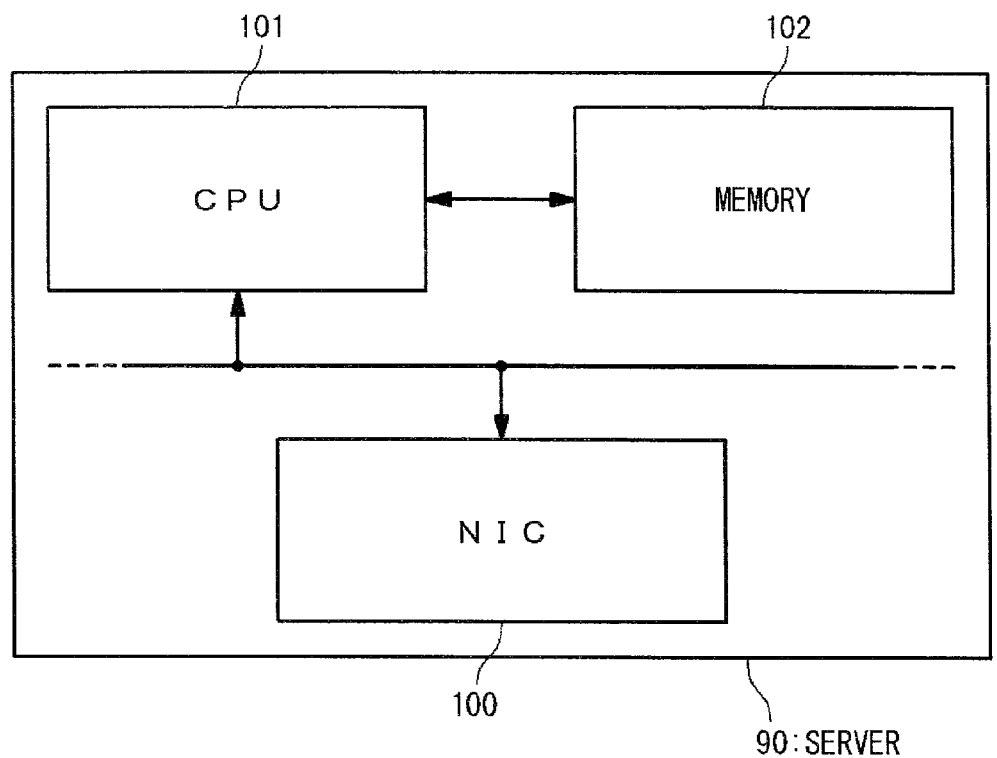
FIG. 6 is a block diagram showing a hardware configuration example of the controller according to the exemplary embodiment of the present invention.

FIG. 6 is a block diagram showing a hardware configuration example of the controller 2 according to the present exemplary embodiment. The functions of the controller 2 are implemented in a single server 90. The server 90 has a network interface card (NIC) 100, a processor (CPU) 101 and a memory 102. The functions of the controller 2 are achieved by cooperation of the hardware and a computer program. More specifically, the network interface card 100 that transmits and receives the frames 10 functions as the above-described reception unit 20 and transmission unit 23. The processor 101 that performs the frame processing functions as the above-described processing unit 21. The above-described node information table 22 is stored in the memory 102. It should be noted that the computer program that realizes the functions of the controller 2 may be recorded on a tangible computer-readable recording medium.

1-4. Application to FCoE

Next, let us consider a case where the present exemplary embodiment is applied to the FCoE.

Figure 7:
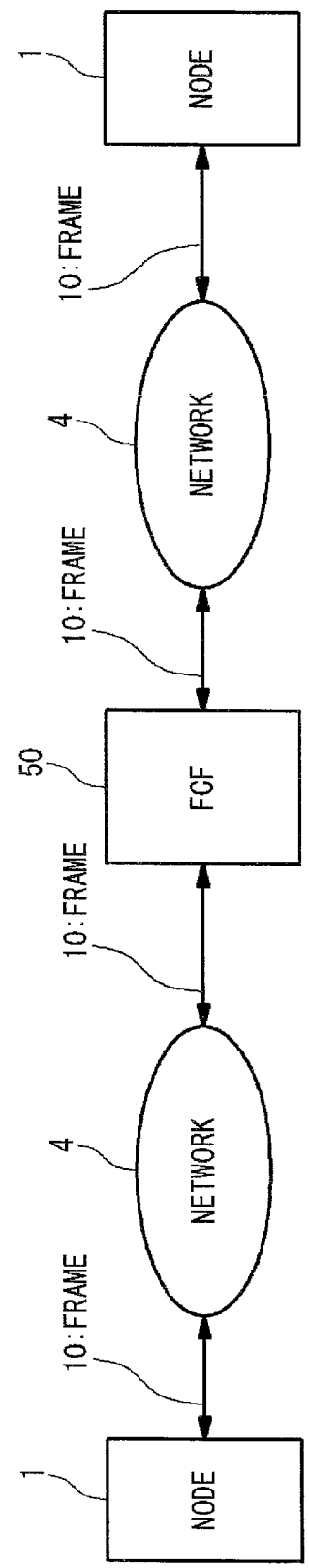
FIG. 7 is a block diagram showing a configuration of a typical FCoE communication network.

FIG. 7 is a block diagram showing a configuration of a typical FCoE communication network. The node 1 that performs the frame communication based on the FCoE is connected to an FCF (FCoE Forwarder) 50 through the network 4 configured by links that support the FCoE. The FCF 50 is a switch for use in the FCoE communication. Currently, the FCoE communication is invariably required to go through the FCF 50.

Figure 8:
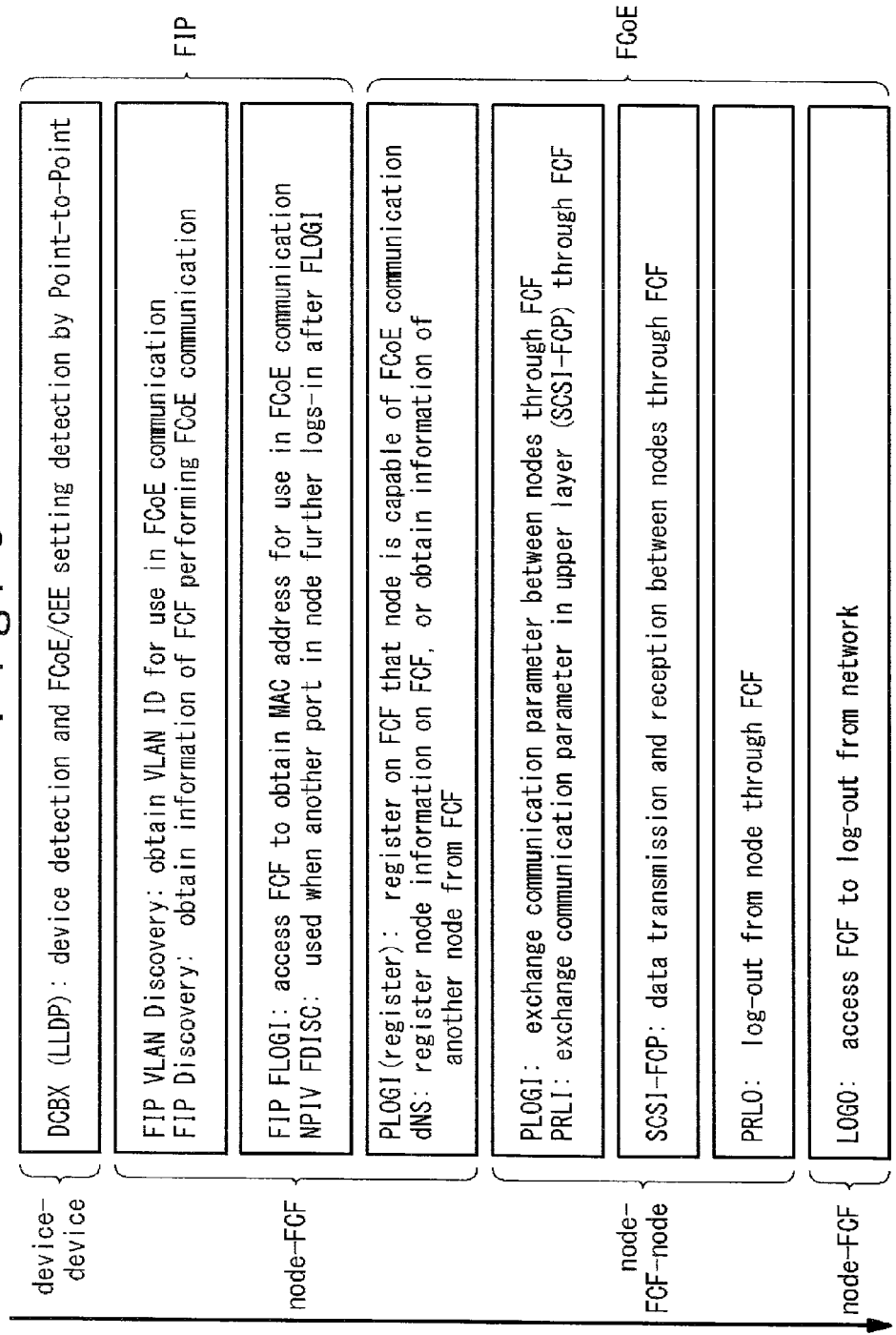
FIG. 8 is a classification diagram of frames used in the typical FCoE communication.

FIG. 8 is a classification diagram of frames used in the typical FCoE communication. Respective frames will be described in order.

1. DCBX (LLDP): exchange information on extension functions used in the Ethernet communication network for performing the FCoE communication, between links.

2. FIP VLAN Discovery: the node obtains a VLAN ID for use in the FCoE communication from the FCF.

3. FIP Discovery: the node obtains a MAC address of the FCF for use in the FCoE communication from the FCF.

4. FIP FLOGI: the node accesses the FCF to obtain a MAC address of itself for use in the FCoE communication.

5. PLOGI: the node exchanges information for the FCoE communication with the FCF and the destination node through the FCF.

6. PRLI: the node exchanges information for data communication with the destination node through the FCF.

7. SCSI-FCP: the node communicates with the destination node through the FCF.

8. PRLO: the node cuts off connection between the nodes (deletes information) through the FCF.

9. LOGO: the node accesses the FCF to cut off the connection between the FCF and the node (deletes information).

The "SCSI-FCP frame" among the above corresponds to the data frame 12, whose amount of information is much larger than that of the other types of frames. In the case of the typical FCoE communication network shown in FIG. 7, all the frames including the SCSI-FCP frames go through the FCF 50. Therefore, a transfer time of the SCSI-FCP frames greatly affects the network performance.

An operation in a case where the present exemplary embodiment is applied to the FCoE is as follows.

First, an operation of the gateway 3 will be described. The gateway 3 determines whether the received frame 10 is a control frame 11 or a data frame 12. The control frame 11 is a frame for exchanging information required for accessing the destination node 1. On the other hand, the data frame 12 is a frame for data transmission and reception between the nodes 1. Among the frames shown in FIG. 8, the "SCSI-FCP" is determined to be the data frame 12 and the rest frame is determined to be the control frame 11.

Figure 9:
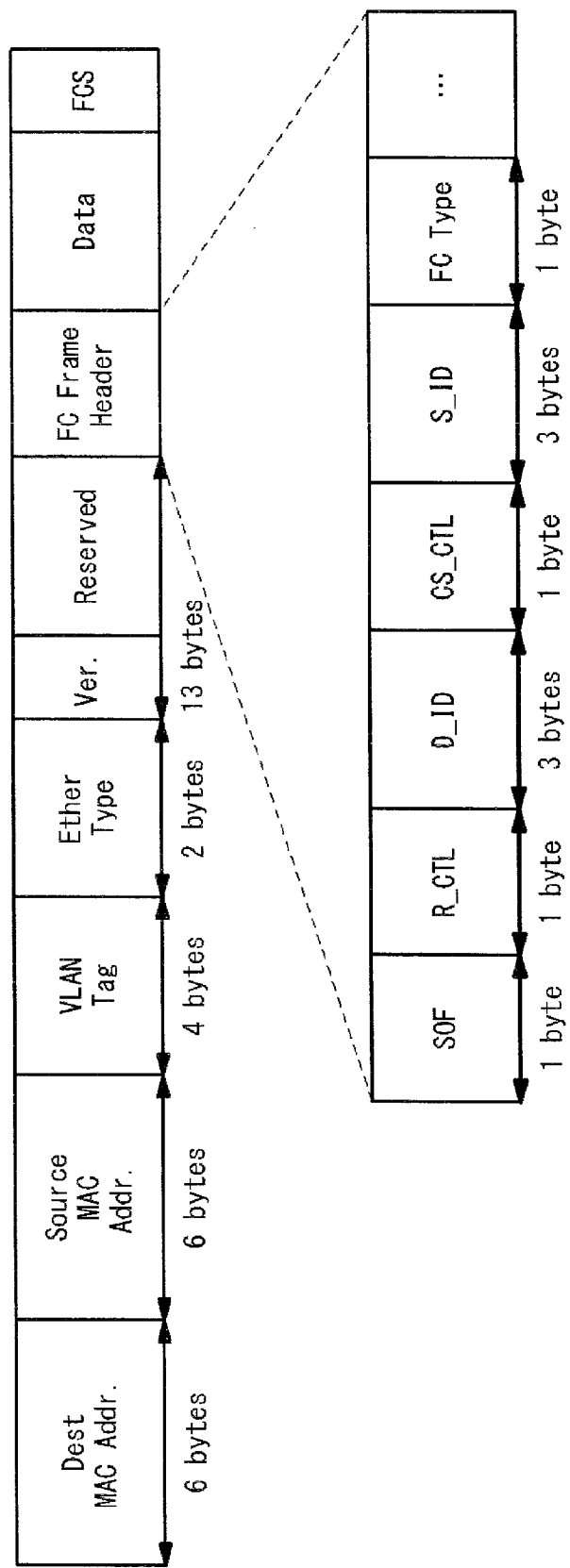
FIG. 9 is a conceptual diagram showing a structure of a SCSI-FCP frame in the typical FCoE communication.

The gateway 3 can determine the frame type by the following method, for example. FIG. 9 is a conceptual diagram showing a structure of the SCSI-FCP frame. As shown in FIG. 9, there is an element "FC Type: FCP" in the FC Field in the FCoE Field. A point with which the SCSI-FCP frame can be clearly distinguished from the other frames is the "FC Type". Therefore, the gateway 3 can determine whether the received frame 10 is the control frame 11 or the data frame 12 by referring to the "FC Type" of the frame 10.

Moreover, the gateway 3 changes the destination MAC address of the frame 10, as necessary. The reason is as follows. In the case of the conventional FCoE communication, both of the control frame and the data frame go through the FCF 50. Therefore, the source node 1, which may not know a MAC address of the destination node 1, tentatively sets the destination MAC address to a MAC address of the FCF 50, and the FCF 50 converts the destination MAC address. However, according to the present exemplary embodiment, the data frame 12 does not go through the controller 2. Since the node 1 sets the destination MAC address of the transmission frame 10 to a MAC address of the controller 2, the network 4 cannot transfer the data frame 12 to the destination node 1, as long as the conversion of the destination MAC address is not performed in the gateway 3. Therefore, in order that the data frame 12 is transferred to the correct destination, the gateway 3 converts the destination MAC address of the data frame 12 into a MAC address of the destination node 1 and then outputs the data frame 12 to the network 4.

The MAC address (virtual MAC address) used in the conventional FCoE communication is not a MAC address (physical MAC address) that the node 1 originally owns but is a MAC address that is dedicated to the FCoE communication and distributed by the FCF 50. There is a rule for allocation of the MAC address that is distributed. That is, the upper 3 bytes of the 6 bytes MAC address are fixed while the lower 3 bytes thereof are variable. The lower 3 bytes are used as an address of the node in the FC frame that is encapsulated to be the FCoE frame. In the case of the conventional FCoE communication, when the node 1 transmits the frame 10 to the destination node 1, the MAC address is set to the MAC address of the FCF 50 and a destination address of the FC frame is set to an address of the destination node 1. Therefore, with regard to the frame 10 that is determined to be the data frame 12, the gateway 3 can obtain the MAC address of the destination node 1 in accordance with the above-described rule by analyzing the destination address of the encapsulated FC frame.

In this manner, the data frames 12 are transferred to the destination node 1 through the network 4 and without through the controller 2.

Next, an operation of the controller 2 will be described. The controller 2 is in charge of the processing with respect to the control frames 11 (i.e. other than SCSI-FCP being the data frame 12) that the conventional FCF 50 has performed.

Figure 10:
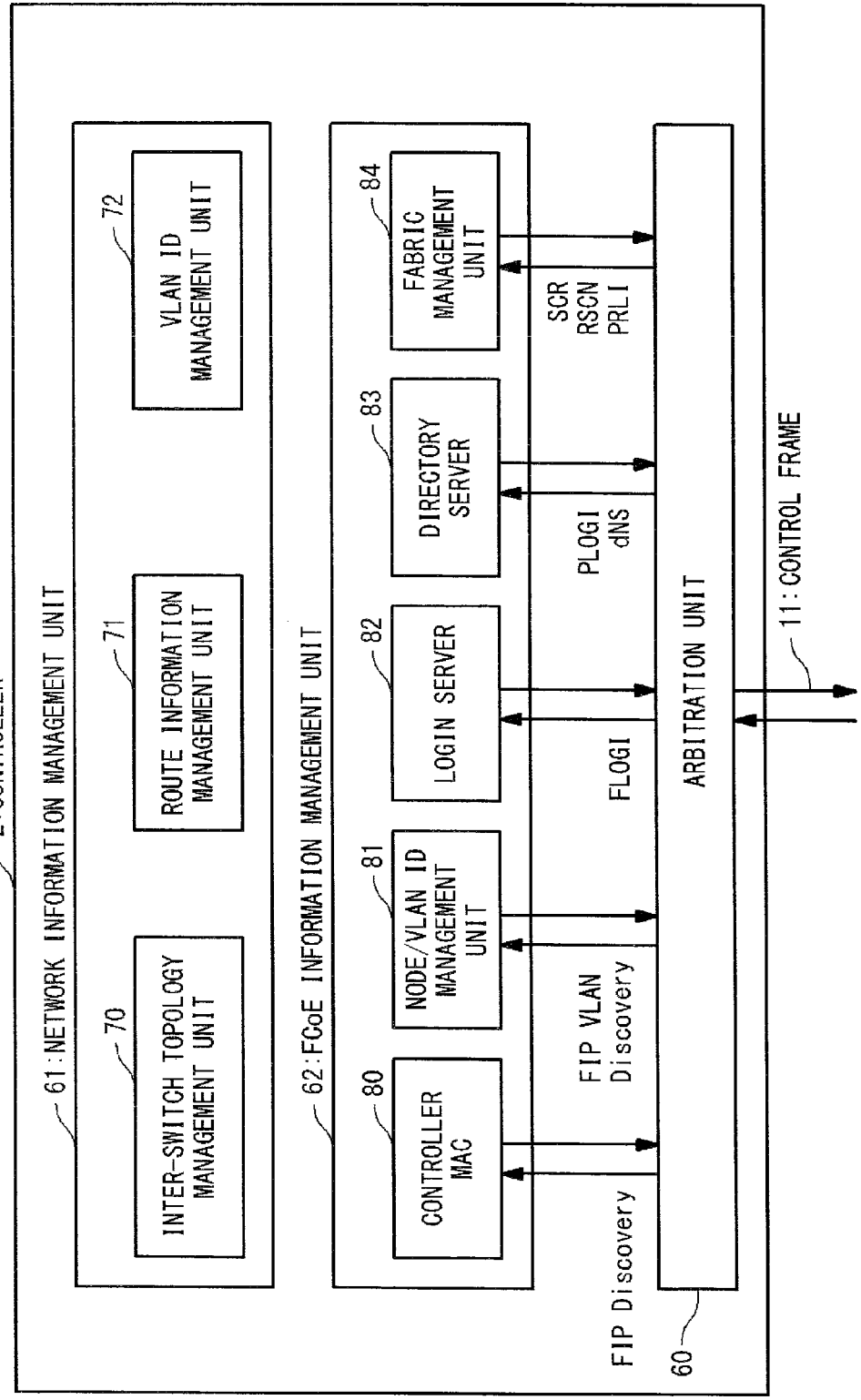
FIG. 10 is a block diagram showing a configuration of a controller in a case where the present invention is applied to the FCoE communication.

FIG. 10 is a block diagram showing a configuration of the controller 2 in the case where the present exemplary embodiment is applied to the FCoE communication. As shown in FIG. 10, the controller 2 has an arbitration unit 60, a network information management unit 61 and an FCoE information management unit 62.

The arbitration unit 60 determines the type of frame that arrives at the controller 2 and forwards the frame to each information management unit (61, 62). Also, the arbitration unit 60 obtains construction information for use in a frame for transmission from each information management unit (61, 62) and transmits the generated frame to the gateway 3.

The network information management unit 61 has an inter-switch topology management unit 70, a route information management unit 71 and a VLAN ID management unit 72.

The inter-switch topology management unit 70 recognizes and manages port connection information of each switch in the network 4.

The route information management unit 71 manages a route between the nodes 1 that is known in the inter-switch topology management unit 70. Also, when receiving a setting request for a route between a new pair of nodes 1 from the FCoE information management unit 62, the route information management unit 71 reflects the route information in each switch.

The VLAN ID management unit 72 manages giving of a VLAN ID to a port of a switch. Also, the VLAN ID management unit 72 searches for a VLAN ID and send a reply, in response to a search request from the FCoE information management unit 62.

The FCoE information management unit 62 has a controller MAC 80, a node/VLAN ID management unit 81, a login server 82, a directory server 83 and a fabric management unit 84.

The controller MAC 80 manages a MAC address for use in communication with the FCoE information management unit 62. The controller MAC 80 replies the MAC address of the controller 2, in response to the FIP Discovery from the node 1.

The node/VLAN ID management unit 81 manages the VLAN ID to which the node 1 belongs. The node/VLAN ID management unit 81 replies the VLAN ID to which the FCoE network belongs, in response to the FIP VLAN Discovery from the node 1.

The login server 82 manages a physical MAC address of the node 1 that is notified by the FLOGI for the purpose of management of the node 1.

The directory server 83 manages WWPN (World Wide Port Name) and WWNN (World Wide Node Name) which are information of each port of the node 1 after the FLOGI and a service class of FC that can be supported. Also, the directory server 73 replies to an inquiry from the node 1 due to the dNS.

The fabric management unit 84 manages a port status of the node 1. When a status change (validation/invalidation of port, entry/withdrawal of port to/from fabric) occurs, the fabric management unit 84 notifies another node of it (RSCN/SCR).

Figure 11:
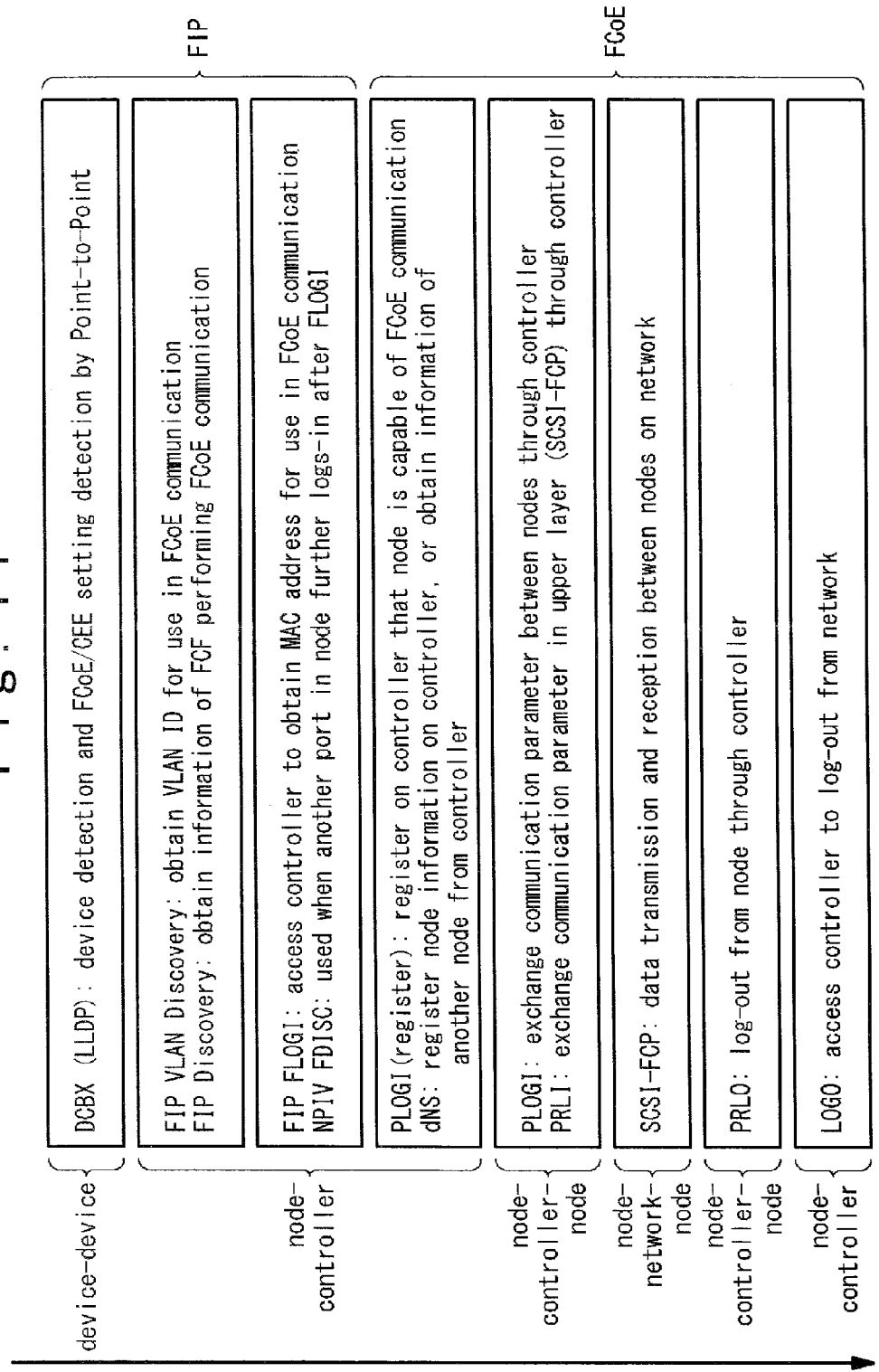
FIG. 11 is a classification diagram of frames in the case where the present invention is applied to the FCoE communication.

FIG. 11 is a classification diagram of frames in the case where the present exemplary embodiment is applied to the FCoE communication. Respective frames will be described in order.

1. DCBX (LLDP): exchange information on extension functions used in the Ethernet communication network for performing the FCoE communication, between links.

2. FIP VLAN Discovery: the node 1 obtains a VLAN ID for use in the FCoE communication from the controller 2.

3. FIP Discovery: the node 1 obtains a MAC address of the controller 2 for use in the FCoE communication from the controller 2.

4. FIP FLOGI: the node 1 accesses the controller 2 to obtain a MAC address of itself for use in the FCoE communication.

5. PLOGI: the node 1 exchanges information for the FCoE communication with the controller 2 and the destination node 1 through the controller 2.

6. PRLI: the node 1 exchanges information for data communication with the destination node 1 through the controller 2.

7. SCSI-FCP: the node 1 communicates with the destination node 1 through the network 4.

8. PRLO: the node 1 cuts off connection between the nodes 1 (deletes information) through the controller 2.

9. LOGO: the node 1 accesses the controller 2 to cut off the connection between the controller 2 and the node 1 (deletes information).

When the present exemplary embodiment is applied to the FCoE communication, as described above, the SCSI-FCP frame as the data frame 12 is separated from the other frames. Then, the SCSI-FCP frame is transferred only by the Ethernet network 4 without through the FCF. Since the SCSI-FCP frames, which greatly contribute to the network performance, need not to go through a specific route, the network performance is increased. Moreover, since a communication device used in the existing Ethernet can be used as well, the network integration becomes easier.

2. Flow Management 2-1. Outline

Next, let us consider a case where the controller 2 in the present exemplary embodiment performs centralized management of communication flows between nodes 1. For example, the controller 2 manages a transfer route of the data frame 12 in the network 4 with respect to each flow. It is also possible that the controller 2 considers load imposed on switches and links in the network 4 to control the transfer routes of respective flows such that load balancing is achieved. By controlling the transfer route with respect to each flow, it is possible to improve utilization efficiency and communication performance of the network 4.

As an example of the technique of performing the centralized management of flow by the controller as described above, "OpenFlow" is known (Reference: Nick McKeown et al., "OpenFlow: Enabling Innovation in Campus Networks", ACM SIGCOMM Computer Communication Review, Vol. 38, No. 2, 2008. (http://www.openflowswitch.org//documents/openflow-wp-latest.pdf)). According to the OpenFlow, route control, failure recovery, load distribution and optimization are performed on an individual flow basis. A controller and a switch used in the OpenFlow are called an open flow controller (OFC: OpenFlow Controller) and an open flow switch (OFS: OpenFlow Switch), respectively.

Hereinafter, we describe the case where the centralized management of flow by the controller 2 is performed in addition to the U/C separation described in the above Section-1. The controller 2 having a function of the centralized management of flow in addition to the function described in the above Section-1 is hereinafter referred to as a controller 2'.

Figure 12:
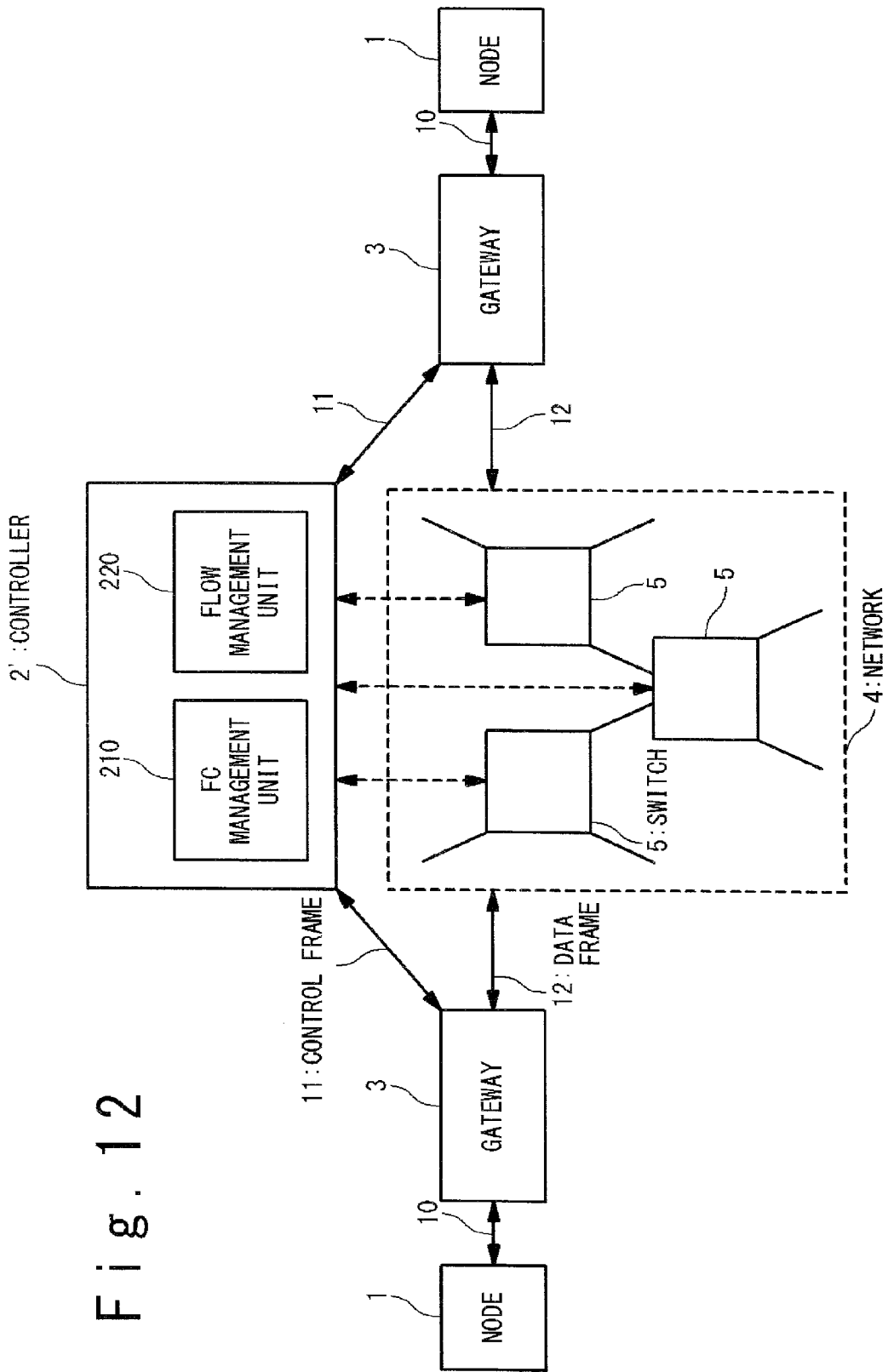
FIG. 12 is a block diagram showing a configuration of a network system according to an exemplary embodiment of the present invention.

FIG. 12 is a block diagram showing a configuration of a network system according to the present exemplary embodiment. An overlapping description with the Section-1 will be omitted as appropriate. The network 4 has a plurality of switches 5. Each switch 5 is communicably connected to the controller 2'.

The controller 2' has an FC management unit 210 and a flow management unit 220. The FC management unit 210 has the same function as that of the controller 2 described in the above Section-1. On the other hand, the flow management unit 220 has a function of performing centralized management of flows between nodes 1. For example, the flow management unit 220 has the same function as that of an open flow controller (OFC) used in the OpenFlow. In this case, an open flow switch (OFS) is used as the switch 5 in the network 4.

The flow management unit 220 manages a transfer route of the data frame 12 in the network 4 with respect to each flow. For example, the flow management unit 220 may consider load imposed on the switches 5 and links in the network 4 to control the transfer routes of respective flows such that load balancing is achieved. By controlling the transfer route with respect to each flow, it is possible to improve utilization efficiency and communication performance of the network 4.

2-2. Route Designing

Next, let us consider a case where the flow management unit 220 of the present exemplary embodiment designs (determines) the transfer route of the data frame 12 in the network 4 between nodes 1.

In the following description, the node 1 that requests communication is referred to as an "initiator node 1A" and the node 1 as a communication destination is referred to as a "target node 1B". The initiator node 1A requests, through the controller 2' (FC management unit 210), communication with the target node 1B. Addresses of both of the initiator node 1A and the target node 1B are required for designing the transfer route of the data frame 12 between the initiator node 1A and the target node 1B. Addresses used in the present exemplary embodiment will be first described with reference to FIG. 13.

Figure 13:
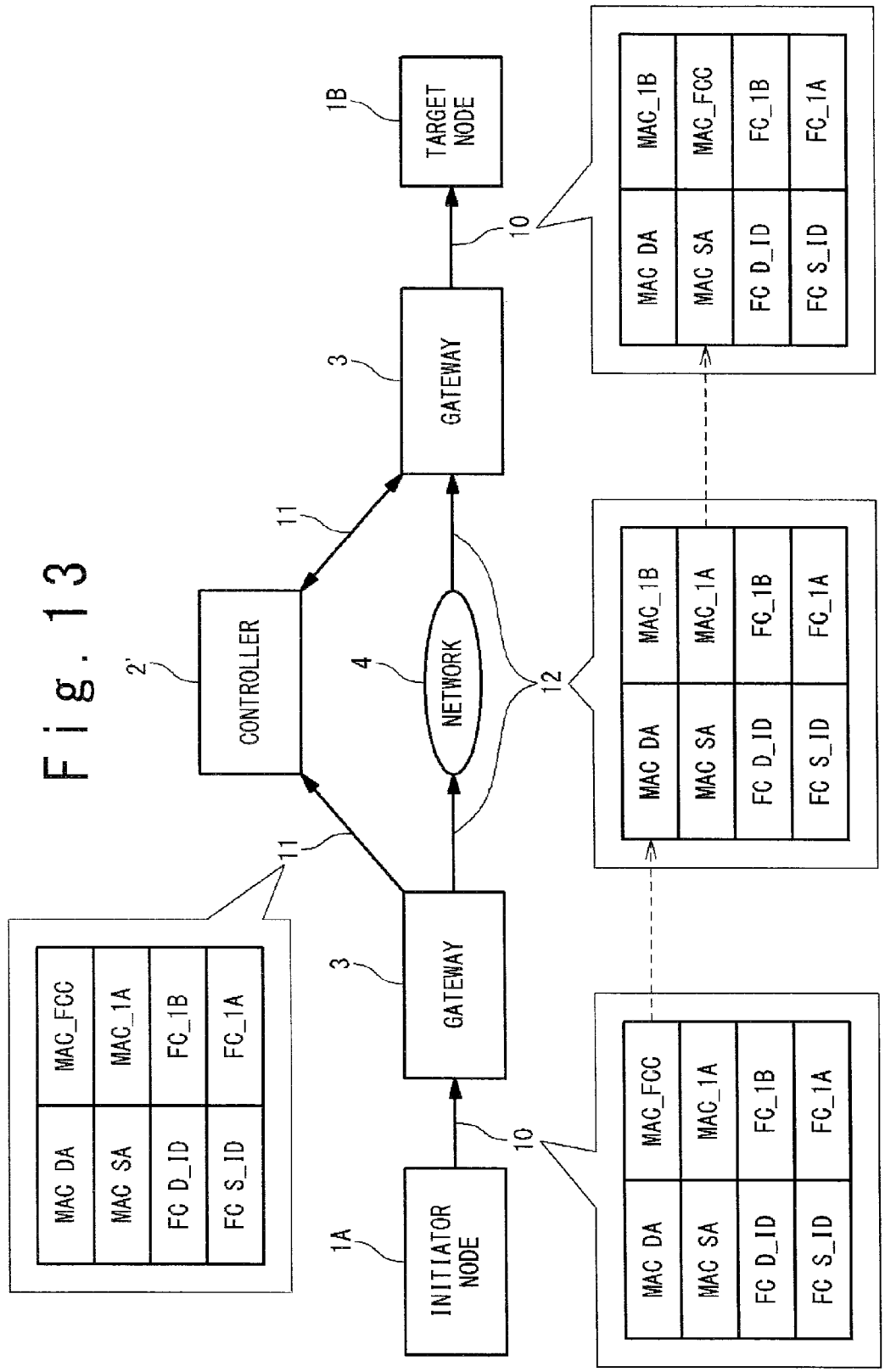
FIG. 13 is a conceptual diagram for explaining addresses used in the exemplary embodiment of the present invention.

In FIG. 13, "MAC_FCC" is the MAC address of the controller 2', "MAC_1A" is the MAC address of the initiator node 1A, and "MAC_1B" is the MAC address of the target node 1B. "MAC DA" and "MAC SA" respectively represent the destination MAC address and the source MAC address indicated in the FCoE frame. It should be noted that the MAC address here means the virtual MAC address which is different from the physical MAC address. As described in the Section-1, the virtual MAC address, which is the MAC address generally used in the FCoE communication, is allocated and distributed by the FC management unit 210.

Also in FIG. 13, "FC_1A" is an FC-ID (i.e. address in the FC protocol) of the initiator node 1A, and "FC_1B" is the FC-ID of the target node 1B. "FC D_ID" and "FC S_ID" respectively represent a destination FC-ID and a source FC-ID indicated in the FCoE frame.

The initiator node 1A transmits a frame 10. Here, the initiator node 1A sets the destination MAC address in the frame 10 for transmission to the MAC address "MAC_FCC" of the controller 2' (see the Section-1).

The gateway 3 determines whether the frame 10 received from the initiator node 1A is a control frame 11 or a data frame 12. In the case of the control frame 11, the gateway 3 forwards the control frame 11 as it is to the controller 2' without performing the address conversion. On the other hand, in the case of the data frame 12, the gateway 3 changes the destination MAC address (MAC DA) to the MAC address "MAC_1B" of the target node 1B and then forwards the data frame 12 to the network 4 (see the Section-1).

The gateway 3 on the side of the target node 1B, when receiving the data frame 12 from the network 4, changes the source MAC address (MAC SA) to the MAC address "MAC_FCC" of the controller 2' and then forwards the data frame 12 to the target node 1B (see the Section-1).

In these circumstances, the flow management unit 220 designs the transfer route of the data frame 12 between the initiator node 1A and the target node 1B. The route designing requires addresses of both of the initiator node 1A and the target node 1B. However, the flow management unit 220 does not always support the FC protocol. In other words, the flow management unit 220 is not always capable of recognizing the FC-ID. For example, an open flow controller can interpret Ethernet/IP/TCP/UDP but cannot interpret the FC protocol. That is, in a case of the FCoE frame, the open flow controller can only interpret the Ethernet section. Therefore, the flow management unit 220 according to the present exemplary embodiment designs the transfer route of the data frame 12 between the initiator node 1A and the target node 1B, based on the MAC address (MAC_1A) of the initiator node 1A and the MAC address (MAC_1B) of the target node 1B.

Next, let us consider timing when the flow management unit 220 performs the route designing. For example, the timing is when the initiator node 1A requests, through the controller 2', the communication with the target node 1B. In another word, the timing is when the initiator node 1A logs-in the fabric.

Processing at the time of log-in in the present exemplary embodiment will be described with reference to FIGS. 13 and 14. At the time of log-in, the initiator node 1A transmits a control frame 11 that requests the communication with the target node 1B (hereinafter referred to as a "communication request frame 11A"), to the controller 2'. In the communication request frame 11A, the FC-ID (FC_1A) of the initiator node 1A and the FC-ID (FC_1B) of the target node 1B are specified. Moreover, the destination MAC address (MAC DA) and the source MAC address (MAC SA) of the communication request frame 11A are the MAC address (MAC_FCC) of the controller 2' and the MAC address (MAC_1A) of the initiator node 1A, respectively. In the example shown in FIG. 11, "PLOGI" is equivalent to the communication request frame 11A.

The gateway 3 receives the communication request frame 11A from the initiator node 1A. Since the communication request frame 11A is a control frame 11, the gateway 3 forwards the received communication request frame 11A to the controller 2' without performing the address conversion.

In response to reception of the communication request frame 11A, the controller 2' designs a transfer route of the data frame 12 between the initiator node 1A and the target node 1B. It should be noted here that the route designing requires both of the MAC address (MAC_1A) of the initiator node 1A and the MAC address (MAC_1B) of the target node 1B, as described above. However, the destination MAC address (MAC DA) of the communication request frame 11A is the MAC address (MAC_FCC) of the controller 2', and the MAC address (MAC_1B) of the target node 1B is not specified. Therefore, the FC management unit 210 of the controller 2' converts the FC-ID (FC_1B) of the target node 1B included in the communication request frame 11A to the MAC address (MAC_1B) of the target node 1B.

Figure 14:
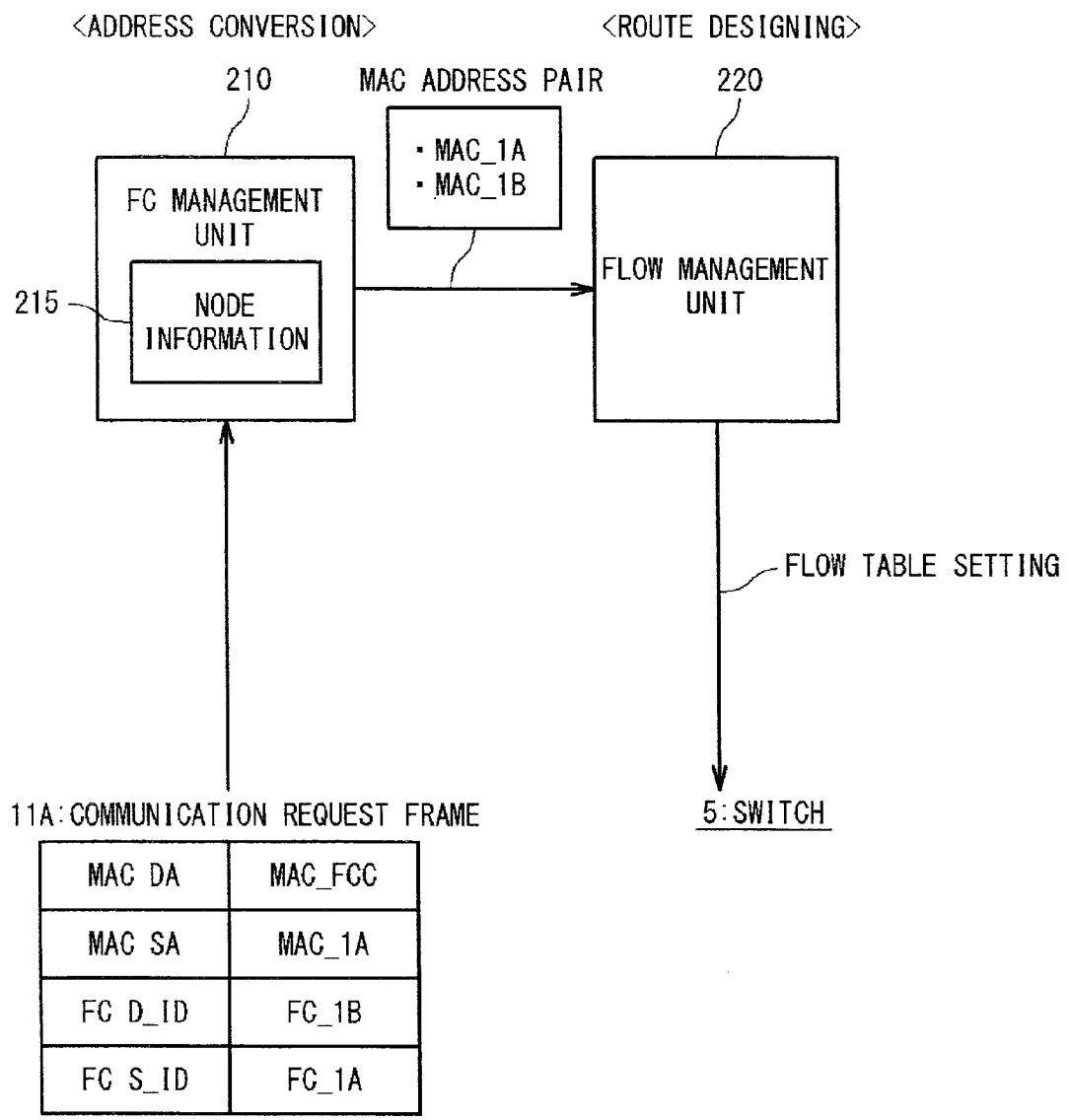
FIG. 14 is a conceptual diagram showing processing by a controller 2' in the exemplary embodiment of the present invention.

More specifically, as shown in FIG. 14, the FC management unit 210 retains node information 215. As described above, the virtual MAC address used in the FCoE is managed by the FC management unit 210 and distributed to each node 1. The node information 215 is information necessary for management of the virtual MAC address and the like. More specifically, the node information 215 includes the physical MAC address, the virtual MAC address, the FC-ID, a correspondence relationship between the virtual MAC address and the FC-ID and the like with respect to each node 1.

The FC management unit 210 receives the communication request frame 11A. Then, the FC management unit 210 refers to the node information 215 (especially to the correspondence relationship between the virtual MAC address and the FC-ID) to convert the FC-ID (FC_1B) of the target node 1B specified in the received communication request frame 11A to the MAC address (MAC_1B) of the target node 1B. As a result, a pair of MAC addresses (MAC_1A, MAC_1B) of the initiator node 1A and the target node 1B required for the route designing is obtained. The FC management unit 210 notifies the flow management unit 220 of the obtained MAC address pair.

The flow management unit 220 retains topology information indicating a connection relationship between the nodes 1 and the switches 5, and designs a transfer route of the data frame 12 between the initiator node 1A and the target node 1B by using the MAC address pair (MAC_1A, MAC_1B). Then, the flow management unit 220 sets a flow table of each switch 5 such that the data frame 12 of the target flow is forwarded along the designed transfer route. In this manner, the controller 2' according to the present exemplary embodiment can design and set up the transfer route of the target flow, at the timing of the log-in of the initiator node 1A.

2-3. Configuration Example

Figure 15:
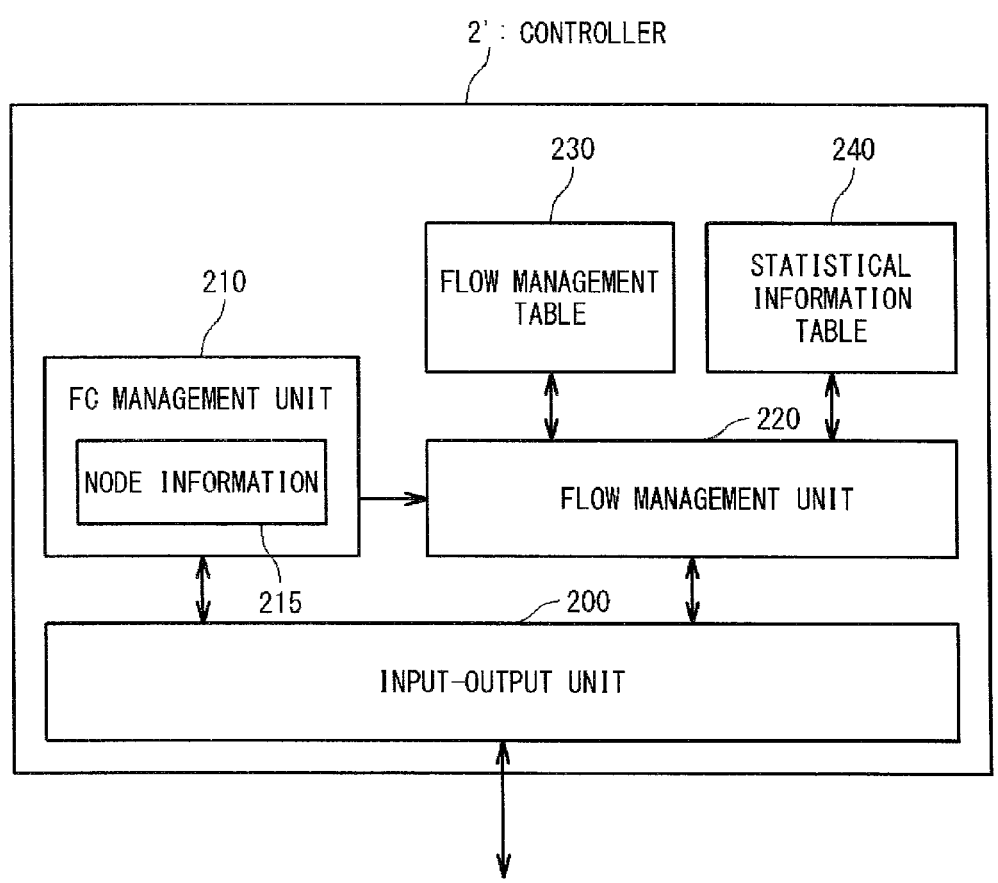
FIG. 15 is a block diagram showing an example of a configuration of the controller 2' in the exemplary embodiment of the present invention.

FIG. 15 is a block diagram showing an example of a configuration of the controller 2' in the present exemplary embodiment. The controller 2' has an input-output unit 200, the FC management unit 210, the flow management unit 220, a flow management table 230 and a statistical information table 240.

The flow management table 230 indicates flow management information with respect to each flow. The flow management information includes the pair of MAC addresses (MAC_1A, MAC_1B) of the initiator node 1A and the target node 1B, transfer route information, an address of the switch 5 nearest to each node 1, and the like.

The statistical information table 240 indicates statistical information. The statistical information includes a total number of passed frames, a total number of discarded frames, the number of frames for each flow and the like at each switch 5. It should be noted that the statistical information is observed by each switch 5 and notified from each switch 5 to the controller 2'.

The flow management table 230 and the statistical information table 240 may be stored in a server outside of the controller 2'.

Figure 16:
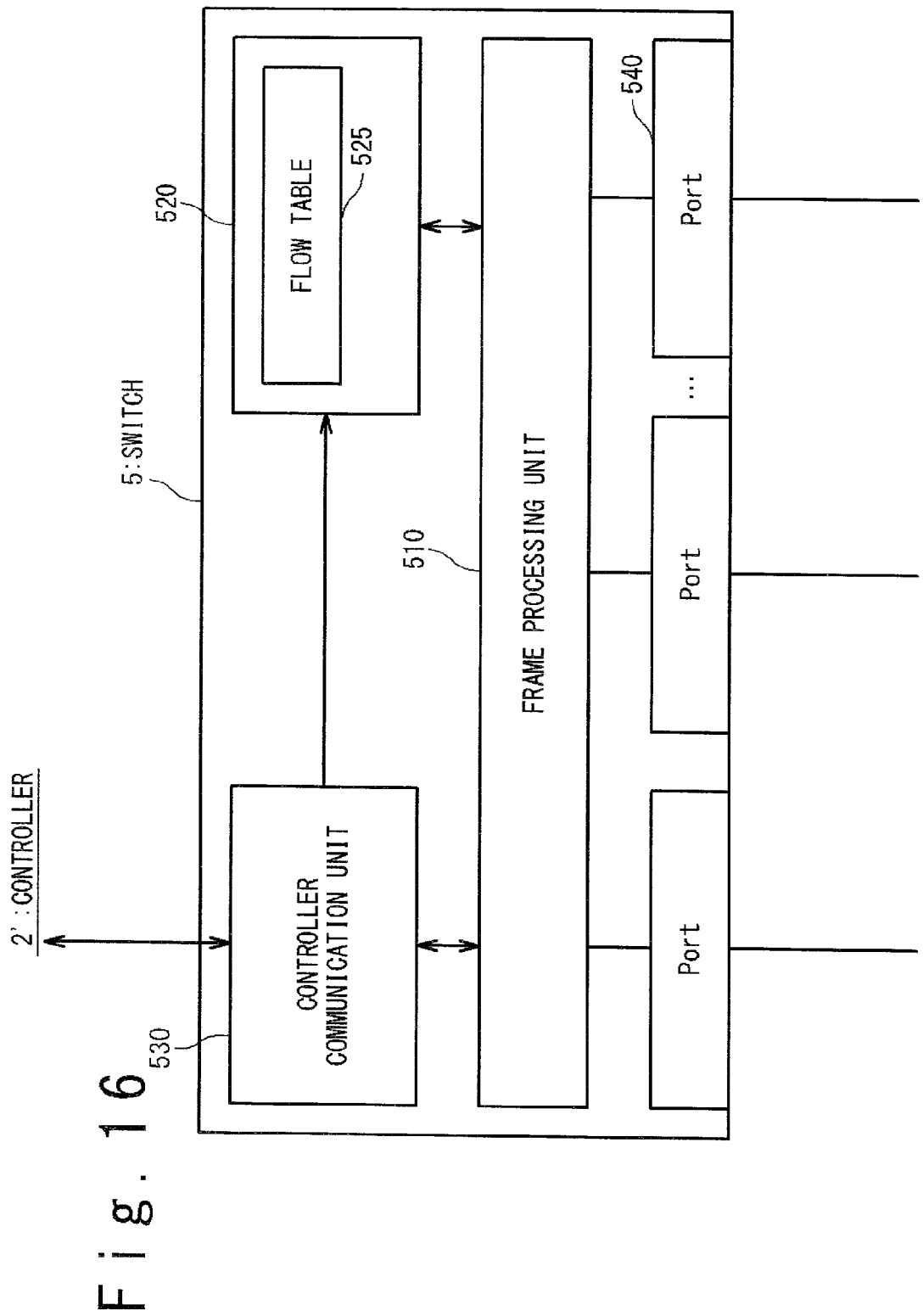
FIG. 16 is a block diagram showing an example of a configuration of a switch in the exemplary embodiment of the present invention.

FIG. 16 is a block diagram showing an example of a configuration of the switch 5 (open flow switch) in the present exemplary embodiment. The switch 5 has a frame processing unit 510, a flow table management unit 520, a controller communication unit 530 and a plurality of ports 540.

The controller communication unit 530 has a function of communication with the controller 2'. In the case of the Open-Flow, SecureChannel is equivalent to the controller communication unit 530.

The flow table management unit 520 performs management of a flow table 525. The flow table 525 has 0 or more flow entry. Each flow entry has fields such as a match condition, an action and a time-out value. The match condition, which is expressed by a combination of fields of a frame header, is used for determining whether or not a received frame matches the flow entry. The action indicates a content of frame processing that is performed with respect to a frame matching the match condition (e.g. the frame processing is to output the received frame to a specified port). The flow table management unit 520 performs setting of the flow table 525 (adding, changing or deleing a flow entry) in accordance with an instruction from the controller 2'.

The frame processing unit 510 receives a frame through a port 540 (input port). Then, the frame processing unit 510 refers to the flow table 525 to determine whether or not a flow entry (hit entry) matching the received frame exists. If the hit entry does not exist, the frame processing unit 510 transmits the received frame to the controller 2' through the controller communication unit 530. On the other hand, if the hit entry exists, the frame processing unit 510 performs, with respect to the received frame, the processing specified by the action in the hit entry (e.g. outputting to a specified output port 540).

Figure 17:
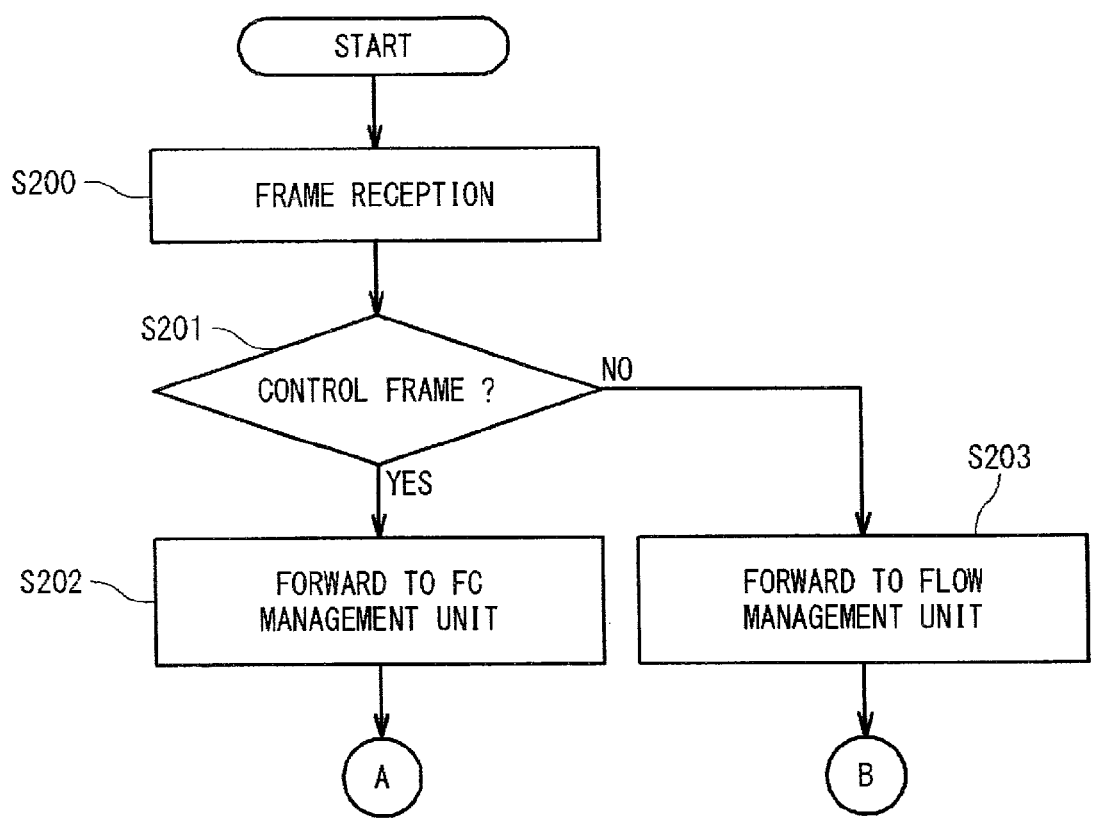
FIG. 17 is a flow chart showing processing by the controller 2' in the exemplary embodiment of the present invention.

FIG. 17 is a flow chart showing processing by the controller 2' in the present exemplary embodiment. The input-output unit 200 of the controller 2' receives a frame (Step S200). The frame received by the input-output unit 200 is not limited to a control frame 11 of the FCoE. The input-output unit 200 may receive a usual Ethernet frame different from the FCoE frame, or the input-output unit 200 may receive a frame indicating the statistical information that is transmitted from each switch 5. Therefore, the input-output unit 200 refers to a header of the received frame to determine whether or not the receives frame is a control frame 11 of the FCoE (Step S201).

If the received frame is a control frame 11 of the FCoE (Step S201; Yes), the input-output unit 200 forwards the control frame 11 to the FC management unit 210 (Step S202). Otherwise (Step S201; No), the input-output unit 200 forwards the received frame to the flow management unit 220 (Step S203).

Figure 18:
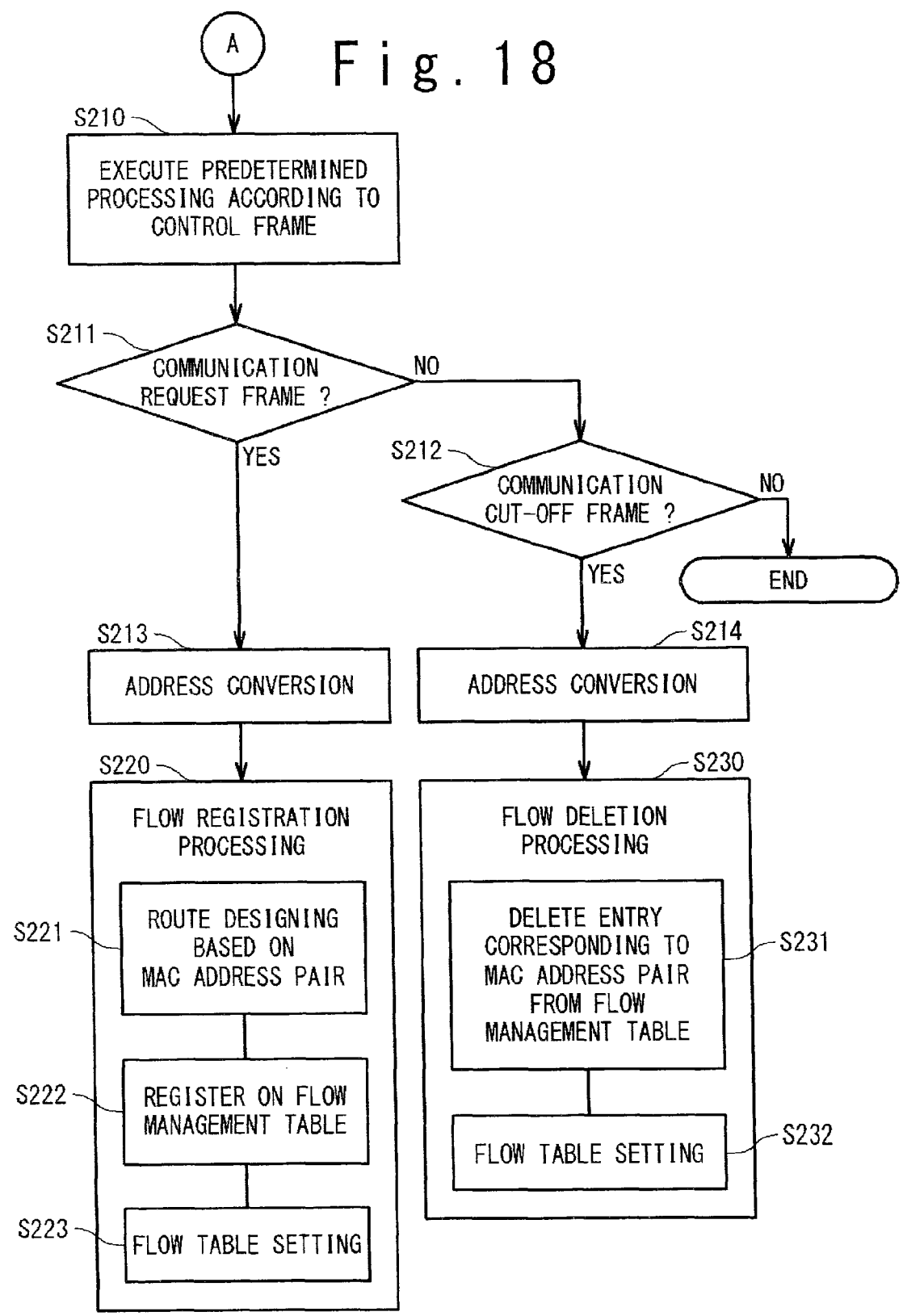
FIG. 18 is a flow chart showing processing by the controller 2' in the exemplary embodiment of the present invention.

FIG. 18 is a flow chart showing processing after Step S202. When receiving the control frame 11 of the FCoE, the FC management unit 210 executes predetermined processing according to the control frame 11 (see the Section-1) (Step S210).

The control frame 11 may be the above-described communication request frame 11A. In this case (Step S211; Yes), the FC management unit 210 performs the address conversion as shown in FIG. 14 (Step S213). The FC management unit 210 notifies the flow management unit 220 of the MAC address pair obtained by the address conversion.

The flow management unit 220 performs flow registration processing (Step S220). More specifically, the flow management unit 220 designs, based on the MAC address pair (MAC_1A, MAC_1B), a transfer route of the data frame 12 between the initiator node 1A and the target node 1B (Step S221). Moreover, the flow management unit 220 registers the flow management information regarding the target flow on the flow management table 230 (Step S222). Furthermore, the flow management unit 220 instructs each switch 5 to set the flow table 525 such that the data frame 12 of the target flow is forwarded along the designed transfer route (Step S223). In accordance with the instruction from the flow management unit 220, the flow table management unit 520 of the switch 5 adds a flow entry regarding the target flow to the flow table 525.

Alternatively, the control frame 11 may be one that requests cut-off of the communication with the target node 1B (hereinafter referred to as a "communication cut-off frame"). When the initiator node 1A logs-out from the fabric, the initiator node 1A transmits the communication cut-off frame to the controller 2'. In the communication cut-off frame, the FC-ID (FC_1A) of the initiator node 1A and the FC-ID (FC_1B) of the target node 1B are specified. The destination MAC address (MAC DA) and the source MAC address (MAC SA) of the communication cut-off frame are the MAC address (MAC_FCC) of the controller 2' and the MAC address (MAC_1A) of the initiator node 1A, respectively. In the example shown in FIG. 11, "LOGO" is equivalent to the communication cut-off frame.

The gateway 3 receives the communication cut-off frame from the initiator node 1A. Since the communication cut-off frame is a control frame 11, the gateway 3 forwards the received communication cut-off frame 11 to the controller 2' without performing the address conversion.

The FC management unit 210 receives the communication cut-off frame (Step S211; No, Step S212; Yes). As in the case of the communication request frame 11A, the FC management unit 210 performs the address conversion (Step S214). As a result, the pair of MAC addresses (MAC_1A, MAC_1B) of the initiator node 1A and the target node 1B is obtained. The FC management unit 210 notifies the flow management unit 220 of the obtained MAC address pair. The flow management unit 220 performs flow deletion processing (Step S230). More specifically, the flow management unit 220 deletes the management information regarding the flow corresponding to the MAC address pair (MAC_1A, MAC_1B) from the flow management table 230 (Step S231). Furthermore, the flow management unit 220 instructs each switch 5 to delete the flow entry regarding the deletion target flow from the flow table 525 (Step S232). In accordance with the instruction from the flow management unit 220, the flow table management unit 520 of the switch 5 deletes the flow entry regarding the deletion target flow from the flow table 525.

Figure 19:
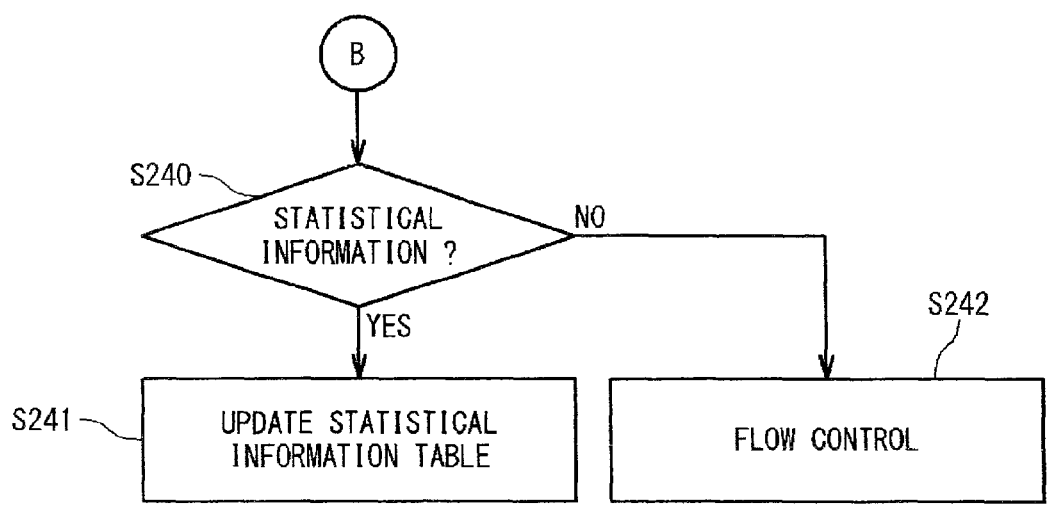
FIG. 19 is a flow chart showing processing by the controller 2' in the exemplary embodiment of the present invention.

FIG. 19 is a flow chart showing processing after Step S203. The flow management unit 220 receives a frame. If the received frame is a statistical information frame transmitted from the switch 5 (Step S240; Yes), the processing proceeds to Step S241. Otherwise, the processing proceeds to Step S242.

In Step S241, the flow management unit 220 updates the statistical information table 240 by using the received statistical information. The flow management unit 220 may refer to the statistical information table 240 to dynamically change the transfer route such that load balancing is achieved.

In Step S242, the flow management unit 220 performs flow control based on the received frame.

For example, in the case of OpenFlow, when a new flow is started, a switch 5 receives an Ethernet frame of the said new flow. However, a hit entry corresponding to the said new flow does not yet exist in the flow table 525 of the switch 5. Therefore, the switch 5 transmits the received frame as a route setup request (also called as a first packet) to the open flow controller. In response to the route setup request, the open flow controller performs route designing/setting with respect to the said new flow.

Similarly, the flow management unit 220 performs route designing/setting if the received frame is a route setup request (first packet).

Also for example, the switch 5 may delete a flow entry from the flow table 525, triggered by time-out. In this case, the switch 5 notifies the controller 2' of the deletion of the flow entry. In response to that, the flow management unit 220 deletes management information regarding the deleted target flow from the flow management table 230.

2-4. Modification Example

In the above-described exemplary embodiment, it is at the time of log-in of the initiator node 1A when the controller 2' performs the route designing. As a modification example, let us consider a case where the route designing is performed in response to a route setup request (first packet) transmitted from the switch 5 as in the case of the typical OpenFlow.

More specifically, the initiator node 1A transmits a first data frame 12 without the route designing/setting being performed at the time of log-in. As shown in FIG. 13, the gateway 3 changes the destination MAC address (MAC DA) of the data frame 12 to the MAC address "MAC_1B" of the target node 1B and then forwards the data frame 12 to the network 4. A switch 5 in the network 4 receives the data frame 12. However, a hit entry corresponding to the new flow does not yet exist in the flow table 525 of the switch 5. Therefore, the switch 5 transmits the received data frame 12 as a route setup request (first packet) to the controller 2'. The route setup request previously includes the MAC address (MAC_1A) of the initiator node 1A and the MAC address (MAC_1B) of the target node 1B. It is therefore possible to perform the route designing based on the route setup request, without performing the address conversion in the controller 2'.

However, it is preferable from a viewpoint of certainty to perform the route designing/setting in response to the communication request frame 11A at the time of log-in.

While the exemplary embodiments of the present invention have been described above with reference to the attached drawings, the present invention is not limited to these exemplary embodiments and can be modified as appropriate by those skilled in the art without departing from the spirit and scope of the present invention.

While a part of or whole of the above-described exemplary embodiments may be described as the following Supplementary notes, it is not limited to that.

(Supplementary Note 1)

A network system comprising:

a node configured to perform transmission and reception of a frame based on FCoE (Fibre Channel Over Ethernet);

a network configured to transfer said frame;

a controller configured to perform management of said node and said network; and a gateway provided with respect to said node, wherein said frame is classified into a control frame for communicating control information necessary for communication and a data frame for communicating data between nodes;

wherein said gateway determines whether a frame received from said node is said control frame or said data frame, forwards said control frame to said controller, and forwards said data frame to said network;

wherein said controller performs said management based on said control frame received from said gateway;

wherein said network transfers said data frame received from said gateway to a target node without through said controller; and wherein said controller comprises a flow management unit configured to manage a transfer route of said data frame in said network with respect to each flow.

(Supplementary Note 2)

The network system according to Supplementary note 1, wherein said node that requests communication with said target node is an initiator node, and wherein in flow registration processing, said flow management unit designs, based on respective MAC addresses of said initiator node and said target node, a transfer route of said data frame between said initiator node and said target node.

(Supplementary Note 3)

The network system according to Supplementary note 2, wherein said initiator node transmits a communication request frame to said controller, said communication request frame being said control frame requesting the communication with said target node, wherein said gateway forwards said communication request frame received from said initiator node to said controller, and wherein said flow management unit executes said flow registration processing in response to said communication request frame.

(Supplementary Note 4)

The network system according to Supplementary note 3, wherein said controller further comprises an FC management unit that retains node information indicating a correspondence relationship between an FC-ID and a MAC address with respect to each node, wherein said communication request frame includes information indicating a MAC address of said initiator node and an FC-ID of said target node, wherein said FC management unit converts, by reference to said node information, the FC-ID of said target node indicated by said communication request frame into a MAC address of said target node, and wherein said flow management unit designs the transfer route of said data frame between said initiator node and said target node, by using the MAC address of said target node obtained by said FC management unit.

(Supplementary Note 5)

The network system according to any one of Supplementary notes 2 to 4, wherein said controller further comprises a flow management table indicating flow management information with respect to each flow, wherein said flow management information indicates a pair of the MAC addresses of said initiator node and said target node and said transfer route of said data frame, and wherein in said flow registration processing, said flow management unit registers said flow management information regarding a corresponding flow on said flow management table.

(Supplementary Note 6)

The network system according to Supplementary note 5, wherein said initiator node transmits a communication cut-off frame to said controller, said communication cut-off frame being said control frame requesting cut-off of the communication with said target node, wherein said gateway forwards said communication cut-off frame received from said initiator node to said controller, and wherein in response to said communication cut-off frame, said flow management unit deletes said flow management information regarding the corresponding flow from said flow management table.

(Supplementary Note 7)

The network system according to any one of Supplementary notes 1 to 6, wherein said node sets a destination MAC address of said frame to a MAC address of said controller; and wherein when said received frame is said data frame, said gateway converts the destination MAC address of said data frame into a MAC address of said target node and then outputs said data frame to said network.

(Supplementary Note 8)

The network system according to any one of Supplementary notes 1 to 7, wherein said gateway determines an FCP frame as said data frame and determines the rest frame as said control frame.

(Supplementary Note 9)

The network system according to any one of Supplementary notes 1 to 8, wherein said gateway is built in a network card of said node.

(Supplementary Note 10)

A frame communication method in a network system, wherein said network system comprises:

a node configured to perform transmission and reception of a frame based on FCoE (Fibre Channel Over Ethernet);

a network configured to transfer said frame; and a controller configured to perform management of said node and said network, wherein said frame is classified into a control frame for communicating control information necessary for communication and a data frame for communicating data between nodes, wherein said frame communication method comprises:

determining whether a frame transmitted from said node is said control frame or said data frame;

forwarding said control frame to said controller and performing, in said controller, said management based on said control frame;

forwarding said data frame to said network and transferring said data frame to a target node without through said controller; and managing, by said controller, a transfer route of said data frame in said network with respect to each flow.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A network system comprising:

a node configured to perform transmission and reception of a frame based on FCoE (Fiber Channel Over Ethernet);

a network configured to transfer said frame;

a controller configured to perform management of said node and said network; and a gateway provided with respect to said node, wherein said frame is classified into a control frame for communicating control information necessary for communication and a data frame for communicating data between nodes;

wherein said gateway determines whether a frame received from said node is said control frame or said data frame, forwards said control frame to said controller, and forwards said data frame to said network;

wherein said controller performs said management based on said control frame received from said gateway;

wherein said network transfers said data frame received from said gateway to a target node without through said controller; and wherein said controller comprises a flow management unit configured to manage a transfer route of said data frame in said network with respect to each flow.

2. The network system according to claim 1, wherein said node that requests communication with said target node is an initiator node, and wherein in flow registration processing, said flow management unit designs, based on respective MAC addresses of said initiator node and said target node, a transfer route of said data frame between said initiator node and said target node.

3. The network system according to claim 2, wherein said initiator node transmits a communication request frame to said controller, said communication request frame being said control frame requesting the communication with said target node, wherein said gateway forwards said communication request frame received from said initiator node to said controller, and wherein said flow management unit executes said flow registration processing in response to said communication request frame.

4. The network system according to claim 3, wherein said controller further comprises an FC management unit that retains node information indicating a correspondence relationship between an FC-ID and a MAC address with respect to each node, wherein said communication request frame includes information indicating a MAC address of said initiator node and an FC-ID of said target node, wherein said FC management unit converts, by reference to said node information, the FC-ID of said target node indicated by said communication request frame into a MAC address of said target node, and wherein said flow management unit designs the transfer route of said data frame between said initiator node and said target node, by using the MAC address of said target node obtained by said FC management unit.

5. The network system according to claim 2,
wherein said controller further comprises a flow management table indicating flow management information with respect to each flow,
wherein said flow management information indicates a pair of the MAC addresses of said initiator node and said target node and said transfer route of said data frame, and
wherein in said flow registration processing, said flow management unit registers said flow management information regarding a corresponding flow on said flow management table.

6. The network system according to claim 5,
wherein said initiator node transmits a communication cut-off frame to said controller, said communication cut-off frame being said control frame requesting cut-off of the communication with said target node,
wherein said gateway forwards said communication cut-off frame received from said initiator node to said controller, and
wherein in response to said communication cut-off frame, said flow management unit deletes said flow management information regarding the corresponding flow from said flow management table.

7. The network system according to claim 1,
wherein said node sets a destination MAC address of said frame to a MAC address of said controller; and
wherein when said received frame is said data frame, said gateway converts the destination MAC address of said data frame into a MAC address of said target node and then outputs said data frame to said network.

8. The network system according to claim 1,
wherein said gateway determines an FCP (Fiber Channel Protocol) frame as said data frame and determines the rest frame as said control frame.

9. The network system according to claim 1,
wherein said gateway is built in a network card of said node.

10. A frame communication method in a network system,
wherein said network system comprises:
a node configured to perform transmission and reception of a frame based on FCoE (Fiber Channel Over Ethernet);
a network configured to transfer said frame; and
a controller configured to perform management of said node and said network,
wherein said frame is classified into a control frame for communicating control information necessary for communication and a data frame for communicating data between nodes,
wherein said frame communication method comprises:
determining whether a frame transmitted from said node is said control frame or said data frame;
forwarding said control frame to said controller and performing, in said controller, said management based on said control frame;
forwarding said data frame to said network and transferring said data frame to a target node without through said controller; and
managing, by said controller, a transfer route of said data frame in said network with respect to each flow.

* * * * *